US008272009B2

(12) United States Patent
Downey et al.

(10) Patent No.: US 8,272,009 B2
(45) Date of Patent: Sep. 18, 2012

(54) SYSTEM AND METHOD FOR INSERTING MEDIA BASED ON KEYWORD SEARCH

(75) Inventors: David Downey, Sherman, CT (US); Bruce J. Anderson, Chesterfield, NJ (US); Daniel C. Wilson, Edmonton (CA); Daniel A. Boulet, Sherwood Park (CA)

(73) Assignee: Invidi Technologies Corporation, Princeton, NJ (US)

( * ) Notice: Subject to any disclaimer, the term of this patent is extended or adjusted under 35 U.S.C. 154(b) by 509 days.

(21) Appl. No.: 11/761,976

(22) Filed: Jun. 12, 2007

(65) Prior Publication Data

US 2007/0288950 A1 Dec. 13, 2007

Related U.S. Application Data

(60) Provisional application No. 60/804,460, filed on Jun. 12, 2006.

(51) Int. Cl.
*H04N 7/025* (2006.01)
*H04N 7/10* (2006.01)

(52) U.S. Cl. ........... 725/32; 725/34; 725/35; 725/36; 725/9

(58) Field of Classification Search .......... 725/9, 34–36, 725/32
See application file for complete search history.

(56) References Cited

U.S. PATENT DOCUMENTS

| | | |
|---|---|---|
| 4,331,974 A | 5/1982 | Cogswell et al. |
| 4,573,072 A | 2/1986 | Freeman |
| 4,602,279 A | 7/1986 | Freeman |
| 4,918,516 A | 4/1990 | Freeman |
| 5,099,319 A | 3/1992 | Esch et al. |
| 5,155,591 A | 10/1992 | Wachob |
| 5,231,494 A | 7/1993 | Wachob |
| 5,260,778 A | 11/1993 | Kauffman et al. |
| 5,283,639 A | 2/1994 | Esch et al. |
| 5,381,477 A | 1/1995 | Beyers, II et al. |
| 5,410,344 A | 4/1995 | Graves |
| 5,446,919 A | 8/1995 | Wilkins |
| 5,515,098 A | 5/1996 | Carles |
| 5,515,858 A | 5/1996 | Myllymaki |
| 5,534,941 A | 7/1996 | Sie et al. |
| 5,534,944 A | 7/1996 | Egawa et al. |
| 5,537,586 A | 7/1996 | Amram et al. |
| 5,585,858 A | 12/1996 | Harper |
| 5,600,364 A | 2/1997 | Hendricks et al. |
| 5,600,366 A | 2/1997 | Schulman |
| 5,636,346 A | 6/1997 | Saxe |
| 5,652,615 A | 7/1997 | Bryant et al. |
| 5,661,516 A | 8/1997 | Carles |
| 5,661,519 A | 8/1997 | Franetzki |
| 5,682,195 A | 10/1997 | Hendricks et al. |
| 5,724,521 A | 3/1998 | Dedrick |
| 5,740,549 A | 4/1998 | Reilly et al. |
| 5,754,939 A | 5/1998 | Herz et al. |
| 5,774,170 A | 6/1998 | Hite et al. |
| 5,805,974 A | 9/1998 | Hite et al. |
| 5,818,539 A | 10/1998 | Naimpally et al. |
| 5,838,678 A | 11/1998 | Davis et al. |
| 5,848,396 A | 12/1998 | Gerace |
| 5,859,660 A | 1/1999 | Perkins et al. |
| 5,872,588 A | 2/1999 | Aras et al. |
| 5,912,709 A | 6/1999 | Takahashi |
| 5,917,830 A | 6/1999 | Chen et al. |
| 5,918,014 A | 6/1999 | Robinson |
| 5,948,061 A | 9/1999 | Merriman et al. |
| 5,982,436 A | 11/1999 | Balakrishnan et al. |
| 5,991,735 A | 11/1999 | Gerace |
| 6,002,393 A | 12/1999 | Hite et al. |
| 6,029,045 A | 2/2000 | Picco et al. |
| 6,049,569 A | 4/2000 | Radha et al. |
| 6,067,303 A | 5/2000 | Aaker et al. |
| 6,088,396 A | 7/2000 | Takahashi |
| 6,088,722 A | 7/2000 | Herz et al. |
| 6,111,896 A | 8/2000 | Slattery et al. |
| 6,151,443 A | 11/2000 | Gable et al. |
| 6,154,496 A | 11/2000 | Radha |
| 6,181,334 B1 | 1/2001 | Freeman et al. |

(Continued)

FOREIGN PATENT DOCUMENTS

EP           0930784 A1      7/1999

(Continued)

OTHER PUBLICATIONS

U.S. Appl. No. 09/545,015, filed Apr. 7, 2000, Haberman.

*Primary Examiner* — Pankaj Kumar
*Assistant Examiner* — Mulugeta Mengesha
(74) *Attorney, Agent, or Firm* — Marsh Fischmann & Breyfogle, LLP

(57) ABSTRACT

A system and method (i.e., utility) is provided for use in connection with delivering content that is targeted to users of a broadcast network. More specifically a utility is provided for inserting targeted content into a broadcast content stream based at least in part on information associated with content of the programming that will be provided via a broadcast network. In this regard, one or more textual fields associated with the programming is monitored (2004) or otherwise reviewed. Based on the textual information from the at least one textual field of the programming, targeted content or 'assets' are identified (2008) (i.e., from a collection of assets) that have at least partially matching textual constraints. At least one of the identified assets may then be inserted (2010) into a content stream of the broadcast network and provided in conjunction with the programming.

43 Claims, 20 Drawing Sheets

U.S. PATENT DOCUMENTS

| | | |
|---|---|---|
| 6,195,368 B1 | 2/2001 | Gratacap |
| 6,204,843 B1 | 3/2001 | Freeman et al. |
| 6,208,691 B1 | 3/2001 | Balakrishnan et al. |
| 6,216,129 B1 | 4/2001 | Eldering |
| 6,246,701 B1 | 6/2001 | Slattery et al. |
| 6,252,873 B1 | 6/2001 | Vines |
| 6,269,120 B1 | 7/2001 | Boice et al. |
| 6,298,348 B1 | 10/2001 | Eldering |
| 6,324,519 B1 | 11/2001 | Eldering |
| 6,353,929 B1 | 3/2002 | Houston |
| 6,418,169 B1 | 7/2002 | Datari |
| 6,438,752 B1 | 8/2002 | McClard |
| 6,446,261 B1 | 9/2002 | Rosser |
| 6,457,010 B1 | 9/2002 | Eldering et al. |
| 6,463,585 B1 | 10/2002 | Hendricks et al. |
| 6,487,721 B1 | 11/2002 | Safadi |
| 6,560,578 B2 | 5/2003 | Eldering |
| 6,615,039 B1 | 9/2003 | Eldering |
| 6,684,194 B1 | 1/2004 | Eldering et al. |
| 6,698,020 B1* | 2/2004 | Zigmond et al. ............... 725/34 |
| 6,704,930 B1 | 3/2004 | Eldering et al. |
| 6,708,335 B1 | 3/2004 | Ozer et al. |
| 6,714,917 B1 | 3/2004 | Eldering et al. |
| 6,820,277 B1 | 11/2004 | Eldering et al. |
| 7,003,792 B1 | 2/2006 | Yuen |
| 7,039,932 B2 | 5/2006 | Eldering et al. |
| 7,051,351 B2* | 5/2006 | Goldman et al. ............... 725/34 |
| 7,089,194 B1* | 8/2006 | Berstis et al. .................... 705/14 |
| 7,100,183 B2 | 8/2006 | Kunkel et al. |
| 7,643,090 B2* | 1/2010 | Ramaswamy et al. ........ 348/558 |
| 7,647,242 B2* | 1/2010 | Bem ............................. 705/14.26 |
| 7,653,627 B2* | 1/2010 | Li et al. .................. 707/999.007 |
| 2001/0025245 A1 | 9/2001 | Flickinger et al. |
| 2001/0032333 A1 | 10/2001 | Flickinger et al. |
| 2001/0049620 A1 | 12/2001 | Blasko |
| 2002/0013943 A1 | 1/2002 | Haberman et al. |
| 2002/0026638 A1 | 2/2002 | Eldering et al. |
| 2002/0032626 A1 | 3/2002 | DeWolf |
| 2002/0049727 A1 | 4/2002 | Rothkopf |
| 2002/0049968 A1 | 4/2002 | Wilson et al. |
| 2002/0053077 A1 | 5/2002 | Shah-Nazaroff et al. |
| 2002/0056107 A1 | 5/2002 | Schlack |
| 2002/0059584 A1 | 5/2002 | Ferman et al. |
| 2002/0072966 A1 | 6/2002 | Eldering et al. |
| 2002/0077891 A1* | 6/2002 | Castle et al. .................... 705/14 |
| 2002/0083435 A1 | 6/2002 | Blasko et al. |
| 2002/0083439 A1 | 6/2002 | Eldering et al. |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0092019 A1 | 7/2002 | Marcus |
| 2002/0099611 A1 | 7/2002 | De Souza et al. |
| 2002/0111154 A1 | 8/2002 | Eldering et al. |
| 2002/0111172 A1 | 8/2002 | DeWolf et al. |
| 2002/0122430 A1 | 9/2002 | Haberman et al. |
| 2002/0123928 A1 | 9/2002 | Schlack et al. |
| 2002/0124182 A1* | 9/2002 | Bacso et al. .................... 713/200 |
| 2002/0129362 A1* | 9/2002 | Chang et al. .................... 725/32 |
| 2002/0129368 A1 | 9/2002 | Schlack et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184130 A1 | 12/2002 | Blasko |
| 2002/0194058 A1 | 12/2002 | Eldering |
| 2003/0004810 A1 | 1/2003 | Eldering |
| 2003/0005437 A1 | 1/2003 | Feuer et al. |
| 2003/0037333 A1 | 2/2003 | Ghashghai |
| 2003/0045957 A1 | 3/2003 | Haberman et al. |
| 2003/0067554 A1 | 4/2003 | Klarfeld et al. |
| 2003/0093792 A1 | 5/2003 | Labeeb et al. |
| 2003/0097299 A1 | 5/2003 | O'Kane |
| 2003/0101454 A1 | 5/2003 | Ozer et al. |
| 2003/0105831 A1 | 6/2003 | O'Kane et al. |
| 2003/0110171 A1 | 6/2003 | Ozer et al. |
| 2003/0115318 A1 | 6/2003 | Wueste |
| 2003/0142689 A1 | 7/2003 | Haberman et al. |
| 2003/0149975 A1 | 8/2003 | Eldering et al. |
| 2003/0188308 A1* | 10/2003 | Kizuka ............................ 725/32 |
| 2003/0200336 A1 | 10/2003 | Pal et al. |
| 2003/0220100 A1 | 11/2003 | McElhatten et al. |
| 2004/0003118 A1 | 1/2004 | Brown et al. |
| 2004/0003398 A1 | 1/2004 | Donian et al. |
| 2004/0015984 A1 | 1/2004 | Yamamoto et al. |
| 2004/0015986 A1 | 1/2004 | Carver et al. |
| 2004/0045020 A1 | 3/2004 | Witt et al. |
| 2004/0117257 A1 | 6/2004 | Haberman |
| 2004/0181818 A1 | 9/2004 | Heyner et al. |
| 2004/0220893 A1 | 11/2004 | Spivack et al. |
| 2004/0243470 A1 | 12/2004 | Ozer et al. |
| 2004/0243623 A1 | 12/2004 | Ozer et al. |
| 2005/0021398 A1 | 1/2005 | McCleskey et al. |
| 2005/0028207 A1 | 2/2005 | Finseth et al. |
| 2005/0080846 A1 | 4/2005 | McCleskey et al. |
| 2005/0091106 A1* | 4/2005 | Reller et al. ...................... 705/14 |
| 2005/0097599 A1 | 5/2005 | Plotnick et al. |
| 2005/0154746 A1* | 7/2005 | Liu et al. ........................ 707/101 |
| 2005/0172318 A1* | 8/2005 | Dudkiewicz et al. ........... 725/46 |
| 2005/0193410 A1 | 9/2005 | Eldering et al. |
| 2005/0228806 A1 | 10/2005 | Haberman |
| 2005/0234992 A1 | 10/2005 | Haberman |
| 2006/0010466 A1* | 1/2006 | Swix et al. ....................... 725/32 |
| 2006/0212350 A1* | 9/2006 | Ellis et al. ........................ 705/14 |
| 2006/0212897 A1* | 9/2006 | Li et al. ............................ 725/32 |
| 2006/0212904 A1* | 9/2006 | Klarfeld et al. .................. 725/46 |
| 2006/0248569 A1* | 11/2006 | Lienhart et al. ............... 725/135 |
| 2006/0287920 A1* | 12/2006 | Perkins et al. .................. 705/14 |
| 2007/0022459 A1* | 1/2007 | Gaebel et al. .................. 725/114 |
| 2007/0076728 A1* | 4/2007 | Rieger et al. .................. 370/401 |
| 2007/0136782 A1* | 6/2007 | Ramaswamy et al. ........ 725/138 |
| 2007/0157228 A1* | 7/2007 | Bayer et al. ..................... 725/34 |
| 2007/0244750 A1* | 10/2007 | Grannan et al. ................. 705/14 |
| 2008/0040740 A1* | 2/2008 | Plotnick et al. ................. 725/32 |
| 2008/0046920 A1* | 2/2008 | Bill .................................. 725/34 |
| 2009/0304357 A1* | 12/2009 | Rashkovskiy et al. .......... 386/95 |
| 2010/0138452 A1* | 6/2010 | Henkin et al. ................. 707/803 |

FOREIGN PATENT DOCUMENTS

| | | |
|---|---|---|
| WO | 99/21338 A1 | 4/1999 |
| WO | 9946708 | 9/1999 |
| WO | 0017775 | 3/2000 |
| WO | 00/33228 A1 | 6/2000 |
| WO | 00/33233 A1 | 6/2000 |
| WO | 01/17250 A1 | 3/2001 |
| WO | 01/47156 A2 | 6/2001 |

* cited by examiner

Content-Based Targeting System Interface

Asset identifier: SUV-AD-Company XY — 1802

Keywords

| | Keyword | Weight | | Keyword | Weight |
|---|---|---|---|---|---|
| Mandatory: | Football | 1 | Optional: | Sports | .5 |
| | | | | Highlights | 1.5 |

1804, 1810, 1806, 1808

Match Criteria: ☐ Exact match    ☒ Similar terms
1818, 1816

1808 → ☐ Require at least one optional  [1 ▼]  ☐ proximity [w/4 ▼]

1820 → ☐ Field of Search  [Any ▼]

1824

Secondary targeting criteria: 1822

| | |
|---|---|
| Demographic limitations | [none ▼] |
| Temporal limitations | [12AM-12AM ▼] |
| Network limitations | [none ▼] |

Access Predefined Keyword list and historic targeting information — 1814

SYSTEM AND METHOD FOR INSERTING MEDIA BASED ON KEYWORD SEARCH

CROSS-REFERENCE

This application claims priority under 35 U.S.C. 119 to U.S. Provisional Application No. 60/804,460, entitled: "ADVATAR AND WORD SEARCH," filed on Jun. 12, 2006, the contents of which are incorporated herein as if set forth in full.

FIELD

Systems and methods presented herein relate to the provision of targeted assets via a network interface. In one specific arrangement, targeted advertising media is selected based on one or more keywords associated with programming delivered via a network content stream.

BACKGROUND

Broadcast network content or programming is commonly provided in conjunction with associated informational content or assets. These assets include advertisements, associated programming, public-service announcements, ad tags, trailers, weather or emergency notifications and a variety of other content, including paid and unpaid content. In this regard, assets providers (e.g., advertisers) who wish to convey information (e.g., advertisements) regarding services and/or products to users of the broadcast network often pay for the right to insert their information into programming of the broadcast network. For instance, advertisers may provide ad content to a network operator such that the ad content may be interleaved with broadcast network programming during one or more programming breaks. The delivery of such paid assets often subsidizes or covers the costs of the programming provided by the broadcast network. This may reduce or eliminate costs borne by the users of the broadcast network programming.

In order to achieve a better return on their investment, asset providers often try to target their assets to a selected audience that is believed to be interested in the goods or services of the asset provider. The case of advertisers on a cable television network is illustrative. For instance, an advertiser or a cable television network may desire to target its ads to certain demographic groups based on, for example, geographic location, gender, age, income etc. Accordingly, once an advertiser has created an ad that is targeted to a desired group of viewers (e.g., targeted group) the advertiser may attempt to procure insertion times in the network programming when the targeted group is expected to be among the audience of the network programming.

Advertisers on the networks have typically attempted to select insertion times for their ad content based on audience classification information provided by audience sampling companies, such Nielsen Media Research Corporation. In broadcast television, audience sampling has often been performed via the monitoring of a small sample of selected households. The households are ideally selected to be representative of the universe of viewers. Specifically, specialized equipment is provided to the selected households where demographic information of each household is known to the sampling company. The specialized equipment is operative to record the viewing habits of the household and periodically report the same. The reported viewing habits of the monitored households are then compiled and sorted to determine, for example, overall market share by channel, by program, as well as by one or more demographic groups (e.g., male, female, etc.).

While such sampling techniques aid in the selection of insertion times for large market share (i.e., large audience) network channels, these sampling techniques are often of limited value for small market share network channels. That is, such sampling may not be statistically representative of an actual audience of a small market share network channel. Likewise, targeting assets of interest to an audience of many network channels remains problematic. In addition, targeting based on demographics may not be sufficiently granular for the needs of certain advertisers and may result in poor matching of an ad to potential consumers of interest.

SUMMARY

In order to better match assets (e.g., advertisements) to users of a broadcast network channel, it may be desirable to select such assets for delivery at a user equipment device (UED) based on current network conditions for that network channel. One indication of current network conditions, such as the make-up/composition of an audience, may in some instances be provided by the content of the programming distributed via the broadcast network channel. That is, what is currently being consumed may closely align with the interests of the current network users and assets corresponding to such programming may be of interest to the network users. In particular, targeting based at least in part on discerned content may allow for better identification of consumers of interest than targeting based on demographics alone.

According to a first aspect, a system and method (i.e., utility) is provided for inserting assets into a broadcast content stream based at least in part on information associated with content of the programming that will be provided via a broadcast network. More specifically, at least one textual field associated with the programming is monitored. Based at least in part on the textual information from the at least one textual field of the programming, assets are identified (i.e., from a collection of assets) that have at least partially matching constraints. Further, at least one of the identified assets (i.e., a selected asset) is inserted into a content stream of the broadcast network. Accordingly, the selected asset may be broadcast in conjunction with the programming.

Variations and additional features exist in the above-noted aspect. For instance, the assets may include any assets of an asset provider, including, without limitation, advertising, programming, public service announcements, etc. Further, various steps and processes may be performed at different locations within a broadcast network. A number of these step and processes may be performed at a location that is referred to as the head end of the network, which may generally entail any network components that are upstream (i.e., across a network interface) of customer premises equipment (CPE) devices or other UEDs. Likewise, asset providers may be able to access one or more components of the utility across one or more network interfaces in order to interact with the utility for providing textual constraints for use with their assets. Further, while the utility may be beneficially implemented for small market share network channels, it will be appreciated that the utility may be implemented with any network channels including large market share channels.

Monitoring of the textual fields associated with the programming may be done, for example, prior to the programming being broadcast by the broadcast network. In this regard, a predetermined time before broadcasting of the programming, textual fields of the programming may be monitored/reviewed in order to identify textual information (e.g., keywords) that may be utilized to select assets having corresponding textual constraints. Alternatively, monitoring may be performed while the programming is broadcast by the broadcast network. In this regard, assets may be dynamically selected and inserted into a content stream in conjunction with broadcasting of the programming.

Monitoring may further include monitoring any textual information associated with the programming. For instance, monitoring may include monitoring the electronic program guide entry for the programming. Such electronic program guide information may include a program title, subtitle and/or program description. It will be appreciated that the program description may include entries including, for example, a description of the content, actors associated with the programming, directors and/or temporal information (date created, season information, etc.) for the programming. Monitoring may further include monitoring closed captioning of the programming. Such closed captioning may include transcription of spoken dialog (for the hearing impaired or for televisions in noisy areas such as restaurant or airports) and described video for the visually impaired. In this regard, the textual content of the programming may be utilized as an indication of, for example, potential consumers of the programming. Accordingly, asset providers may specify associated constraints for their assets in order to target viewers.

The textual information that is searched is not limited to explicit text. For example, vendors of programming could associate metadata with programming that may be included in the fields searched. This metadata need not be reflected in program guides, closed captioning or other explicit text. Moreover, speech or other content may be converted into text using certain existing technologies. This text may also be searched but need not be delivered to network users, e.g., television viewers.

The textual information may also be searched with respect to multiple languages. For example, program guides and closed captioning, as well as transcribed dialog, may be available in multiple languages. Similarly, assets may be available in multiple languages. Thus, the text may be searched to identify not only an appropriate asset but also an appropriate language for the asset.

Such constraints may include the requirement that one or more textual strings or combinations of textual strings be included within the textual information of a particular program with which the asset is associated. For instance, such constraints may require that one or more keywords be present within the textual fields of the programming. Further, asset providers may specify which textual field is monitored to determine if the program satisfies the textual constraints of an asset. For instance, the asset providers may require that specific keywords be located within the program title, subtitle, program description and/or within the closed captioning of the programming. In further arrangements, asset providers may require the presence of a predetermined minimum number of specified keywords. Asset providers may also require the presence of at least one mandatory keyword and at least one optional keyword and/or any combination of the two. Further, asset providers may include weighting factors for specific keywords. That is, certain specified keywords may be weighted differently. Additionally and/or alternatively, asset providers may require the absence of one or more keywords from the textual fields of the programming. In another arrangement, the asset providers may require the presence of at least first and second specified keywords within the textual field where the first and second keywords are within a predetermined proximity of one another. As discussed below, such textual targeting may be combined with one or more mandatory and/or permissive demographic or other targeting constraint, e.g., to associate an asset with a program related to "travel" and having significant viewership among females over 40.

Identifying assets from a collection of assets having at least partially matching textual constraints may include matching text from the one or more textual fields of the programming with the textual constraints of each asset and generating a goodness of fit value. For instance, an asset including three specified keywords that match the textual information may have a higher goodness of fit value than an asset having a single matching keyword. Alternatively, such matching may include a binary matching. In such an arrangement, assets having one or more matching keywords may be identified as being available for insertion with in a content stream. In one arrangement, selection between available assets may be random.

Further, when multiple assets are available for insertion, one or more secondary considerations may be utilized to determine which asset will be inserted into a content stream. That is, selecting may further include utilizing additional information associated with the programming to select between a plurality of assets having at least partially matching textual constraints. Such additional information may be utilized with targeting criteria associated with each asset. For instance, each asset may have targeting criteria that is directed towards the demographics of the intended viewing audience of the programming and/or temporal limitations associated with the delivery time of the asset, and/or network limitations. Such demographic information may include the age, gender, income, geographic location and/or personal interest of an actual or intended audience of the programming. Network limitations may include the inclusion or exclusion of particular networks for the particular asset. It will be further appreciated that additional targeting criteria associated with the asset may be utilized. In any case, targeting criteria in addition to the textual constraints of the asset may be utilized to select one or more of the assets for insertion into the content stream.

Inserting a selected asset may include replacing a default asset in the content stream that is used to deliver the programming with the selected asset. In another arrangement, inserting may include transmitting instructions to at least a portion of UEDs within the broadcast network to output the selected asset during a predetermined asset delivery spot within the programming. In such an arrangement, the selected asset may have been previously stored in storage media of the UEDs. In another arrangement, inserting may include inserting the selected asset into a parallel content stream that is broadcast in synchrony with a content stream that includes the programming. In this case, information may be provided to at least a portion of the UEDs in the broadcast network regarding the availability of the asset on the parallel content stream. The UEDs may be operative to switch to the asset on the parallel content stream during an asset delivery spot. In this regard, textual targeting may be used to select assets for insertion into content streams and/or to select assets for delivery at the UED.

As will be further appreciated, utilization of parallel content streams may allow for inserting a second, a third or more assets (e.g., additional matching assets) of the same and/or additional asset providers into additional parallel content streams (e.g., containing parallel assets). Accordingly, the UEDs of the network users may be operative to select an asset for individual network users (e.g., based on subscriber classification information and/or textual targeting information developed by each UED). In such an arrangement, assets for the parallel content streams may be selected based in part on demographics or other factors.

According to another aspect, a utility is provided for selecting assets at the site of a network user based at least in part on the content of the broadcast programming. In this regard, the utility may be implemented at a customer premises equipment device (UED) such as a digital set top box. The UED selects assets having textual constraints that match textual information in current programming received via a broadcast content stream. In this regard, the UED may monitor incoming programming in order to identify textual information associated with that programming. Based on textual information associated with the programming, the UED may select an asset for presentation to a network user who is receiving the programming. The aspect is based in part on the recognition that the content of what is currently being consumed may be closely aligned with the interests of the current network user.

In one arrangement, the UED may select a pre-stored asset for delivery during an asset delivery spot within the programming. Alternatively, the UED may select between different asset options provided by the broadcast network based on the textual information associated with the programming being delivered to a current user. This may require providing asset keyword information to UEDs in advance of asset delivery spots.

In any arrangement, the UED may determine a goodness of fit value for each asset. The UED may then select one of the assets based at least in part on the goodness of fit value. In one arrangement, additional criteria may be utilized to select one or more assets for delivery. Such further criteria may include targeting criteria associated with the assets. Such targeting criteria may relate to demographic criteria, temporal criteria and/or network criteria. In this regard, it will be appreciated that information associated with the UED (e.g., historic use information, geographic information, etc) may be utilized in conjunction with the targeting criteria and textual information to determine an asset that may be best suited for presentation to a current network user. For example, logic resident on the UED or elsewhere may determine that a UED is frequently tuned to sports related programming at a particular time on a particular day. This information may be used, alone or in conjunction with other developed user classification information, in targeting assets.

According to another aspect, a system is provided for use in delivering assets to users of a broadcast network based at least in part on the textual content of the programming provided by the broadcast network. The system includes a platform that provides an interface for receiving textual constraints from asset providers. In this regard, the interface allows for receiving one or more textual constraints for use in disseminating assets of the asset providers. The system further includes a processor that is operative to compare the textual constraints of the assets with textual information associated with programming. That is, the system may match the textual constraints of the assets with the textual information of the programming to aid in the selection of an asset for dissemination with the programming.

The platform may be any system that allows an asset provider to provide textual constraints for use with their assets. In this regard, the platform may also allow the asset provider to provide their assets to the broadcast network in conjunction with constraints for those assets. Further, the system may allow the asset provider to provide additional targeting criteria for use with their assets. Such additional targeting criteria may include, without limitation, demographic constraints, temporal constraints and/or network constraints.

In one arrangement, the platform includes a graphical user interface. This graphical user interface may provide various prompts that allow asset providers to indicate one or more textual constraints for their assets. In any arrangement, the interface may provide historical information associated with different textual terms (e.g., keywords). For instance, the interface may provide asset providers with the frequency that various terms appear in programming and/or cross-reference different terms to, for example, demographic groups. Likewise, the platform may provide additional functionality. For instance, the platform may allow an asset provider to indicate exact matches or allow for use of synonyms with one or more keywords.

According to another aspect, a system is provided for selecting assets based on programming content at a location of a network user. In this regard, the system may be incorporated into a UED. Accordingly, the device may include a network interface for receiving a broadcast content stream from a broadcast network and a processor for monitoring textual information associated with the programming received via the network interface. The processor may be further operative to compare the textual information with textual constraints associated with two or more assets. Based on such comparison, the processor may then select one of the assets that may be presented in conjunction with the programming. In a further arrangement, the system may include a report generator for generating reports indicative that a particular asset was delivered to a network user. Such report may be provided to a network platform via the network interface.

BRIEF DESCRIPTION OF THE DRAWINGS

FIG. 18 illustrates a GUI for entering textual constraints for use with content-based targeting.

DETAILED DESCRIPTION

Figure 1:
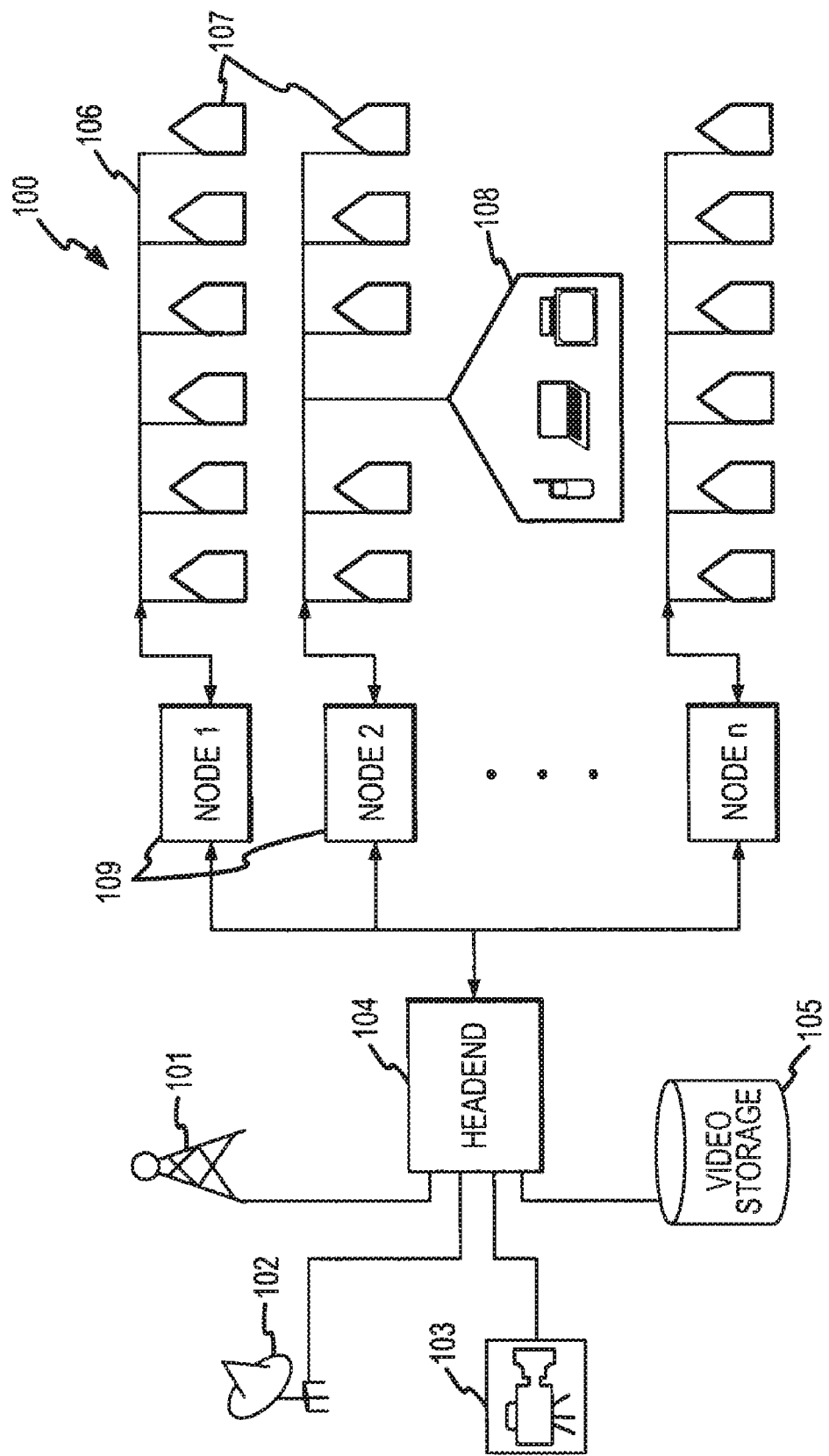
FIG. 1 illustrates major components of a cable television network.
Figure 2:
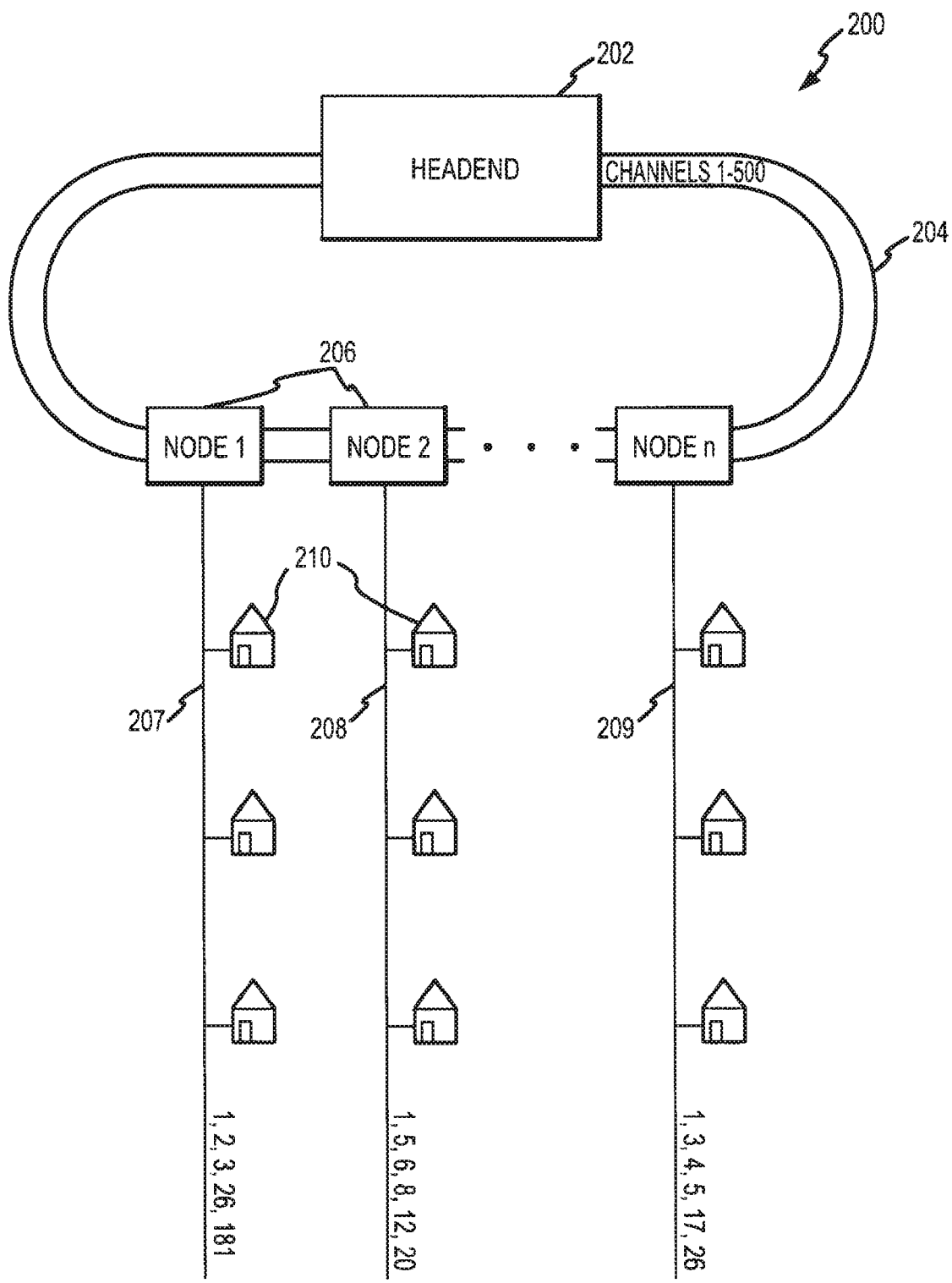
FIG. 2 illustrates bandwidth usage that is dynamically determined on a geographically dependent basis via networks.

The present invention relates to various structure and functionality for delivery of targeted assets, classification of network users or consuming patterns, and network monitoring for use in a communications network, as well as associated business methods. The invention has particular application with respect to networks where content is broadcast to network users; that is, the content is made available via the network to multiple users without being specifically addressed to individual user nodes in point-to-point fashion. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention make use of bi-directional communication channels which are not readily available, for example, in connection with conventional airwave based televisions or radios (i.e., such communication would involve supplemental communication systems). In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets are sometimes referred to as "addressable" assets (though, as will be understood from the description below, targeting can be accomplished without addressing in a point-to-point sense). For example, these targeted assets may include advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed with untargeted programming (e.g., provided during programming breaks) or may otherwise be combined with the programming as by being superimposed on a screen portion in the case of video programming. In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

The following description is divided into a number of sections. In the Introduction section, the broadcast network and network programming environments are first described. Thereafter, an overview of the targeted asset environment is provided including a discussion of certain shortcomings of the conventional asset delivery paradigm. The succeeding section provides an overview of a targeted asset system in accordance with aspects of the present invention highlighting advantages of certain preferred implementations thereof. Finally, the last section describes use of the targeted asset system to implement various functionalities with specific reference to textual based targeted advertising in a cable television environment.

I. INTRODUCTION

A. Broadcast Networks

The present invention has particular application in the context of networks primarily used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. As noted above, examples of broadcast networks include cable television networks, satellite television networks, and satellite radio networks. In addition, audio, video or other content may be broadcast across Internet protocol and telephony networks. In any such networks, it may be desired to insert targeted assets such as advertisements into a broadcast stream. Examples of broadcast networks used to delivery content to specific users include broadcast networks used to deliver on demand content such as VOD and podcasts. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users. Among other things, the headend 104 may be operative to amplify, convert and otherwise process the broadcast content signals as well as to combine the signals into a common cable for transmission to network users 107 (although graphically depicted as households, as described below, the system of the present invention can be used in implementations where individual users in a household are targeted). It also is not necessary that the target audience be composed households or household members in any sense. For example, the present invention can be used to create on-the-fly customized presentations to students in distributed classrooms, e.g., thus providing examples which are more relevant to each student or group of students within a presentation being broadcast to a wide range of students. The headend also processes signals from users in a variety of contexts as described below. The headend 104 may thus be thought of as the control center or local control center of the cable television network 100.

Typically, there is not a direct fiber link from the headend 104 to the customer premises equipment (UED) 108. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. The resulting content within a node area is typically distributed by optical and/or coaxial links 106 to the premises of particular users 107. Finally, the broadcast signal is processed by the UED 108 which may include a television, data terminal, a digital set top box, DVR or other terminal equipment. It will be appreciated that digital or analog signals may be involved in this regard.

Users employ the network, and network operators derive revenue, based on delivery of desirable content or programming. The stakeholders in this regard include programming providers, asset providers such as advertisers (who may be the same as or different than the programming providers), network operators such as Multiple Systems Operators (MSOs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers. Asset providers include a wide variety of manufacturers, retailers, service providers and public interest groups interested in, and generally willing to pay for, the opportunity to deliver messages to users on a local, regional, national or international level. As discussed below, such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. In addition, the networks may use insertion spots for internal marketing as discussed above, and the spots may be used for public service announcements or other non-advertising content. Network operators are generally responsible for delivering content to users and otherwise operating the networks as well as for contracting with the networks and asset providers and billing. Users are the end consumers of the content. Users may employ a variety of types of UEDs including television, set top boxes, iPOD™ devices, data terminals, satellite delivered video or audio to an automobile, appliances (such as refrigerators) with built-in televisions, etc.

As described below, all of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment. Network operators and asset providers can benefit from increased value of the network as an asset delivery mechanism and, thus, potentially enhanced revenues. The present invention addresses all of these interests.

It will be noted that it is sometimes unclear that the interests of all of these stakeholders are aligned. For example, it may not be obvious to all users that they benefit by consuming such assets. Indeed, some users may be willing to avoid consuming such assets even with an understanding of the associated costs. Network operators and asset providers may also disagree as to how programming should best be distributed, how asset delivery may be associated with the programming, and how revenues should be shared. As described below, the present invention provides a mechanism for accommodating potentially conflicting interests or for enhancing overall value such that the interests of all stakeholders can be advanced.

Assets can be provided via a variety of distribution modes including real-time broadcast distribution, forward-and-store, and on-demand delivery such as VOD. Real-time broadcast delivery involves synchronous delivery of assets to multiple users such as the conventional paradigm for broadcast radio or television (e.g., airwave, cable or satellite). The forward-and-store mode involves delivery of assets ahead of time to UEDs with substantial storage resources, e.g., a DVR or data terminal. The asset is stored for later display, for example, as prompted by the user or controlled according to logic resident at the UED and/or elsewhere in the communications network. The on-demand mode involves individualized delivery of assets from the network to a user, often on a pay-per-view basis. The present invention can be utilized in connection with any of these distribution modes or others. In this regard, important features of the present invention can be implemented using conventional UEDs without requiring substantial storage resources to enhance even real-time broadcast programming, for analog and digital users.

The amount of programming that can be delivered to users is limited by the available programming space. This, in turn, is a function of bandwidth. Thus, for example, cable television networks, satellite television networks, satellite radio networks, and other networks have certain bandwidth limitations. In certain broadcast networks, the available bandwidth may be divided into bandwidth portions that are used to transmit the programming for individual channels or stations. In addition, a portion of the available bandwidth may be utilized for bi-directional messaging, metadata transmissions and other network overhead. Alternately, such bi-directional communication may be accommodated by any appropriate communications channels, including the use of one or more separate communications networks. The noted bandwidth portions may be defined by dedicated segments, e.g., defined by frequency ranges, or may be dynamically configured, for example, in the case of packetized data networks. As will be described below, in one implementation, the present invention uses available (dedicated or opportunistically available) bandwidth for substantially real time transmission of assets, e.g., for targeted asset delivery with respect to a defined asset delivery spot. In this implementation, bi-directional communications may be accommodated by dedicated messaging bandwidth and by encoding messages within bandwidth used for asset delivery. A DOCSIS path or certain TELCO solutions using switched EP may be utilized for bi-directional communications between the headend and UEDs and asset delivery to the UEDs, including real-time asset delivery, in the systems described below.

B. Scheduling

What programming is available on particular channels or other bandwidth segments at particular times is determined by scheduling. Thus, in the context of a broadcast television network, individual programming networks, associated with particular programming channels, will generally develop a programming schedule well into the future, e.g., weeks or months in advance. This programming schedule is generally published to users so that users can find programs of interest. In addition, this programming schedule is used by asset providers to select desired asset delivery spots.

Asset delivery is also scheduled. That is, breaks are typically built into or otherwise provided in programming content. In the case of recorded content, the breaks are predefined. Even in the case of live broadcasts, breaks are built-in. Thus, the number and duration of breaks is typically known in advance, though the exact timing of the breaks may vary to some extent. However, this is not always the case. For example, if sporting events go into overtime, the number, duration and timing of breaks may vary dynamically. As discussed below, the system of the present invention can handle real-time delivery of assets for updated breaks. In connection with regularly scheduled breaks, as discussed below, defined avail windows establish the time period during which certain breaks or spots occur, and a cue tone or cue message signals the beginning of such breaks or spots. In practice, an avail window may be as long as or longer than a program and include all associated breaks. Indeed, avail windows may be several hours long, for example, in cases where audience demographics are not expected to change significantly over large programming blocks. In this regard, an MSO may merge multiple avail windows provided by programming networks.

More specifically, a break may include a series of asset delivery spots and the content of a break may be determined by a number of entities. For example, some asset delivery is distributed on a basis coextensive with network programming, e.g., on a national basis. This asset delivery is conventionally scheduled based on a timed playlist. That is, the insertion of content is centrally controlled to insert assets at defined times. Accordingly, the programming and national asset delivery may be provided by the programming networks as a continuous content stream without cues for asset insertion. For example, prime-time programming on the major networks is often principally provided in this fashion.

In other cases, individual spots within a break are allocated for Regional Operations Center (ROC), affiliate, super headend or local (headend, zone) content. In these cases, a cue tone or message identifies the start of the asset delivery spot or spots (a series of assets in a break may all trigger from one cue). The cue generally occurs a few seconds before the start of the asset delivery insertion opportunity and may occur, for example, during programming or during the break (e.g., during a national ad). The system of the present invention can be implemented at any or all levels of this hierarchy to allow for targeting with respect to national, regional and local assets. In the case of regional or local targeted asset delivery, synchronous asset options (as discussed below) may be inserted into designated bandwidth in response to cues. In the case of national asset delivery, network signaling may be extended to provide signals identifying the start of a national spot or spots, so as to enable the inventive system to insert synchronous national asset options into designated bandwidth. For example, such signaling may be encrypted for use only by the inventive targeted asset system.

Network operators or local network affiliates can generally schedule the non-national assets to be included within defined breaks or spots for each ad-supported channel. Conventionally, this scheduling is finalized ahead of time, typically on a daily or longer basis. The scheduled assets for a given break are then typically inserted at the headend in response to the cue tone or message in the programming stream. Thus, for example, where a given avail window includes three breaks (each of which may include a series of spots), the scheduled asset for the first break is inserted in response to the first cue, the scheduled asset for the second break is inserted in response to the second cue, and the scheduled asset for the third break is inserted in response to the third cue. If a cue is missed, all subsequent assets within an avail window may be thrown off.

It will be appreciated that such static, daily scheduling can be problematic. For example, the programming schedule can often change due to breaking news, ripple effects from schedule over-runs earlier in the day or the nature of the programming. For example, certain live events such as sporting events are difficult to precisely schedule. In such cases, static asset delivery schedules can result in a mismatch of scheduled asset to the associated programming. For example, when a high value programming event such as a certain sporting event runs over the expected program length, it may sometimes occur that assets intended for another program or valued for a smaller audience may be shown when a higher value or better-tailored asset could have been used if a more dynamic scheduling regime were available. The asset targeting system allows for such dynamic scheduling as will be discussed in more detail below. The asset targeting system can also accommodate evolving standards in the field of dynamic scheduling.

C. The Conventional Asset Delivery Paradigm

Conventional broadcast networks may include asset-supported and premium content channels/networks. As noted above, programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time-slot buys. Specifically, asset providers generally identify a particular program or time-slot on a particular network where they desire their assets to be aired. The cost for the airing of the asset depends on a number of factors, but one primary factor is the size of the audience for the programming in connection with which the asset is aired. Thus, the standard pricing model is based on the cost per thousand viewers (CPM), though other factors such as demographics or audience composition are involved as discussed below. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. Thus, the historical performance of the particular program, for example, as estimated by the Nielsen system, may be used to set asset delivery prices for future breaks associated with that program.

Figure 4:
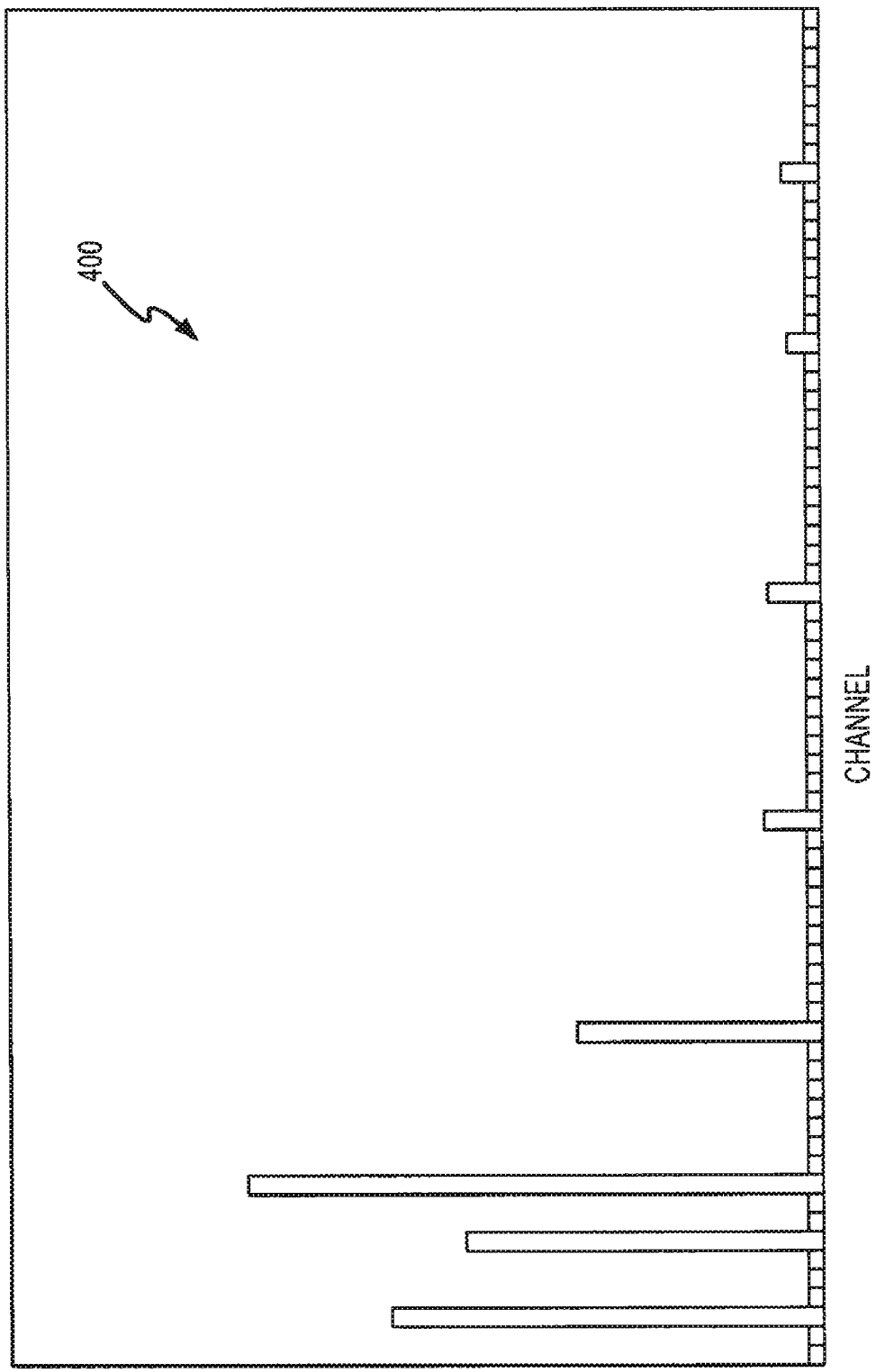
FIG. 4 illustrates an exemplary audience shares of various networks as may be used to set asset delivery prices for future breaks associated with the program.

In practice, this results in a small number of programming networks being responsible for generating a large portion of the overall asset revenues. This is graphically depicted in FIG. 4 which generally illustrates this phenomenon, although it is not based on actual numbers. As shown in FIG. 4, it is often the case that three or four programming networks out of many available programming networks garner very large shares whereas the remaining programming networks have small or negligible share. Indeed, in some cases, many programming networks will have a share that is so small that it is difficult to statistically characterize based on typical Nielsen sampling group sizes. In these cases, substantial asset revenues may be generated in connection with the small number of programming networks having a significant share while very little revenue is generated with respect to the other programming networks. This is true even though the other programming networks, in the aggregate, may have a significant number of users in absolute terms. Thus, the conventional paradigm often fails to generate revenues commensurate with the size of the total viewing audience serviced by the network operator. As discussed below, this is a missed revenue opportunity that can be addressed in accordance with the present invention.

As noted above, the pricing for asset delivery depends on the size of the viewing audience and certain other factors. One of those factors relates to the demographics of interest to the asset provider. In this regard, a given program will generally have a number of different ratings for different demographic categories. That is, the program generally has not only a household rating, which is measured against the universe of all households with televisions, but also a rating for different demographic categories (e.g., males 18-24), measured against the universe of all members of the category who have televisions. Thus, the program may have a rating of 1 (1%) overall and a rating of 2 (2%) for a particular category. Typically, when asset providers buy a time-slot, pricing is based on a rating or ratings for the categories of interest to the asset provider. This results in significant inefficiencies due to poor matching of the audience to the desired demographics.

Figure 3:
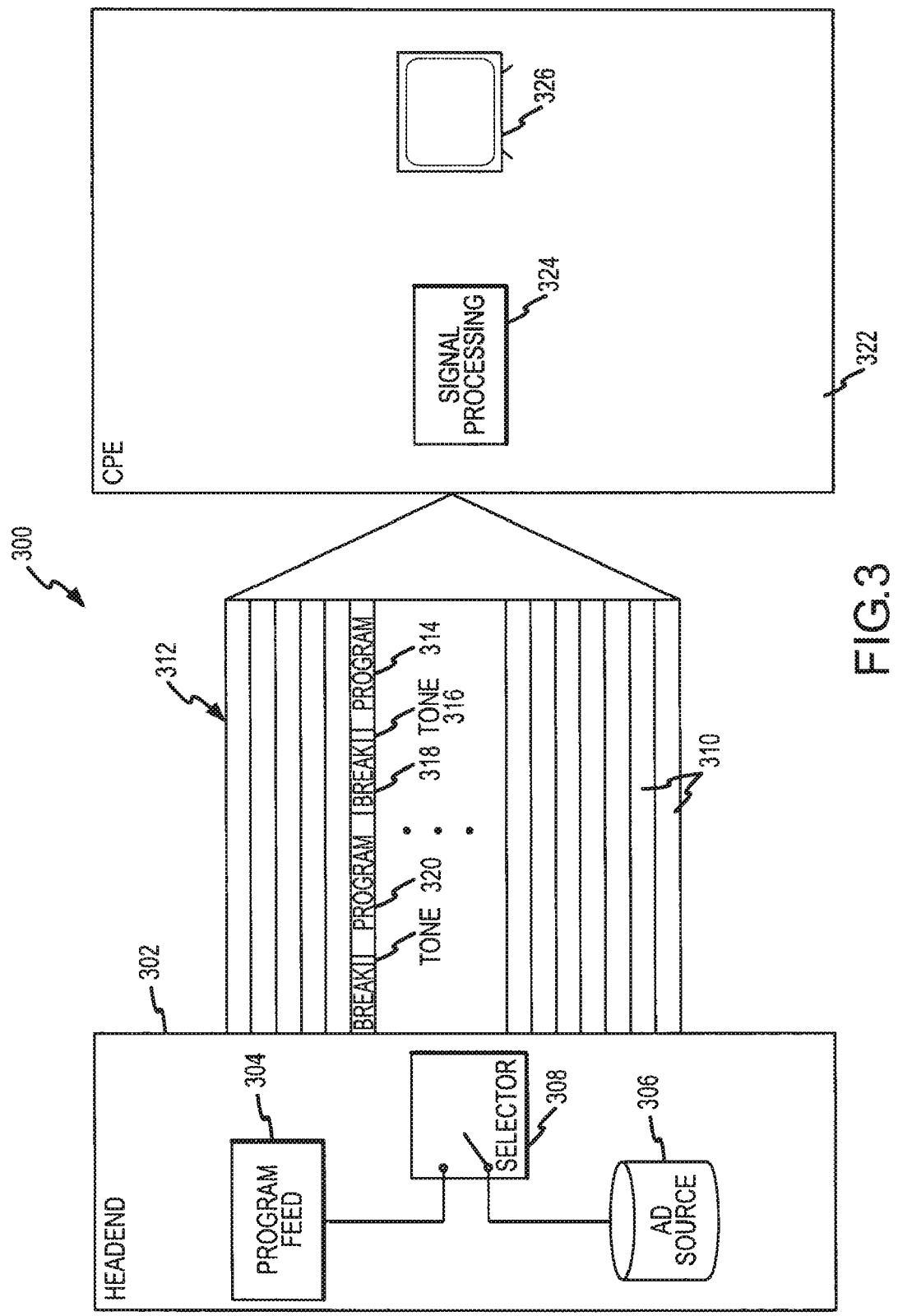
FIG. 3 illustrates asset insertion as accomplished at a headend.
Figure 15:
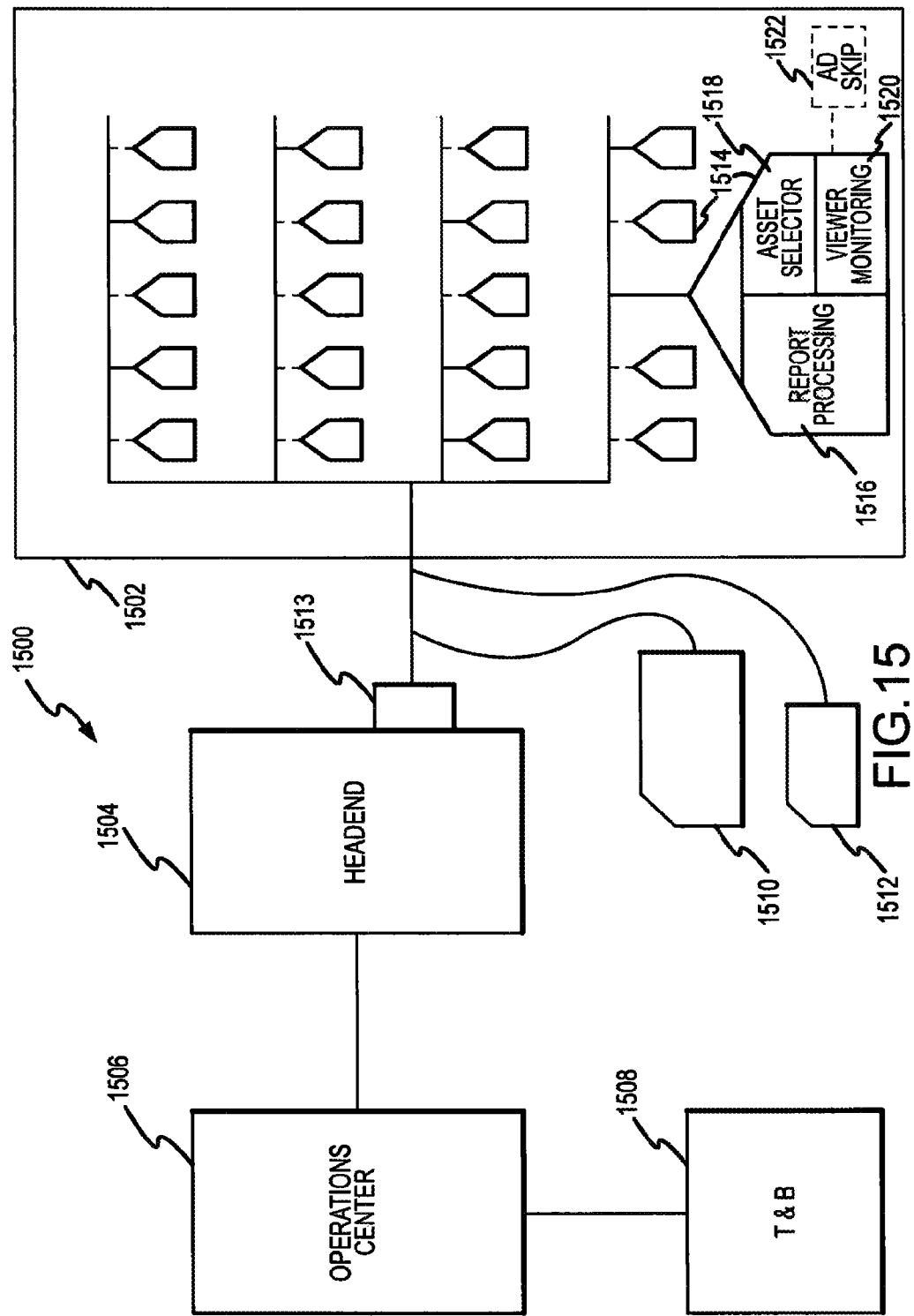
FIG. 15 illustrates a reporting system.

Conventionally, asset insertion is accomplished at the headend. This is illustrated in FIG. 3. In the illustrated system 300, the headend 302 includes a program feed 304 and an asset source 306. As noted above, the program feed 304 may be associated with a variety of programming sources such as video storage, an antenna, satellite dish or fiber feed from a studio or the like. The asset source 306 may include a tape library or other storage system for storing pre-recorded assets. A platform associated with the headend 302—in this case, denoted a selector 308—inserts programming from the program feed 304 and assets from the asset source 306 into the video stream of an individual channel 310. This is done for each channel to define the overall content 312 that is distributed to subscribers (or at least to a node filter). Typically, although not necessarily, the selector 308 effectively toggles between the program feed 304 and the asset source 306 such that the programming and assets are inserted in alternating, non-time overlapping fashion. Thus, as shown in FIG. 3, a particular channel may include a time segment 314 of programming followed by a cue tone 316 (which may occur, for example, during a programming segment, or during a time period of an asset provided with the programming stream, just prior to an insertion opportunity) to identify the initiation of a break 318. In response to the tone, the selector 308 is operative to insert assets into the programming stream for that channel. At the conclusion of the break 318, the selector 308 returns to the program feed to insert a further programming segment 320. An example of a timeline in this regard is shown in FIG. 15.

This content 312 or a filtered portion thereof is delivered to UEDs 322. In the illustrated embodiment the UED 322 is depicted as including a signal processing component 324 and a television display 326. It will be appreciated that these components 324 and 326 may be embodied in a single device and the nature of the functionality may vary. In the case of a digital cable user, the signal processing component 324 may be incorporated into a digital set top box (DSTB) for decoding digital signals. Such boxes are typically capable of bi-directional messaging with the headend 302 which will be a significant consideration in relation to functionality described below.

II. SYSTEM OVERVIEW

A. The Targeted Asset Delivery Environment

Against this backdrop described in the context of the conventional asset delivery paradigm, a system embodying the present invention is described below. The inventive system, in the embodiments described below, allows for delivery of targeted assets such as advertising so as to address certain shortcomings or inefficiencies of conventional broadcast networks. Generally, such targeting entails delivering assets to desired groups of individuals or individuals having desired characteristics. These characteristics or audience classification parameters may be defined based on personal information, demographic information, psychographic information, geographic information, or any other information that may be relevant to an asset provider in identifying a target audience. Preferably, such targeting is program independent in recognition that programming is a highly imperfect mechanism for targeting of assets. For example, even if user analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities including very fine granularities. For example, it may be desired to target a group, such as based on a geographical grouping, a household characterization or even an individual user characterization. The present invention accommodates program independent targeting, targeting with a high degree of granularity and targeting based on a variety of different audience classifications.

Figure 5:
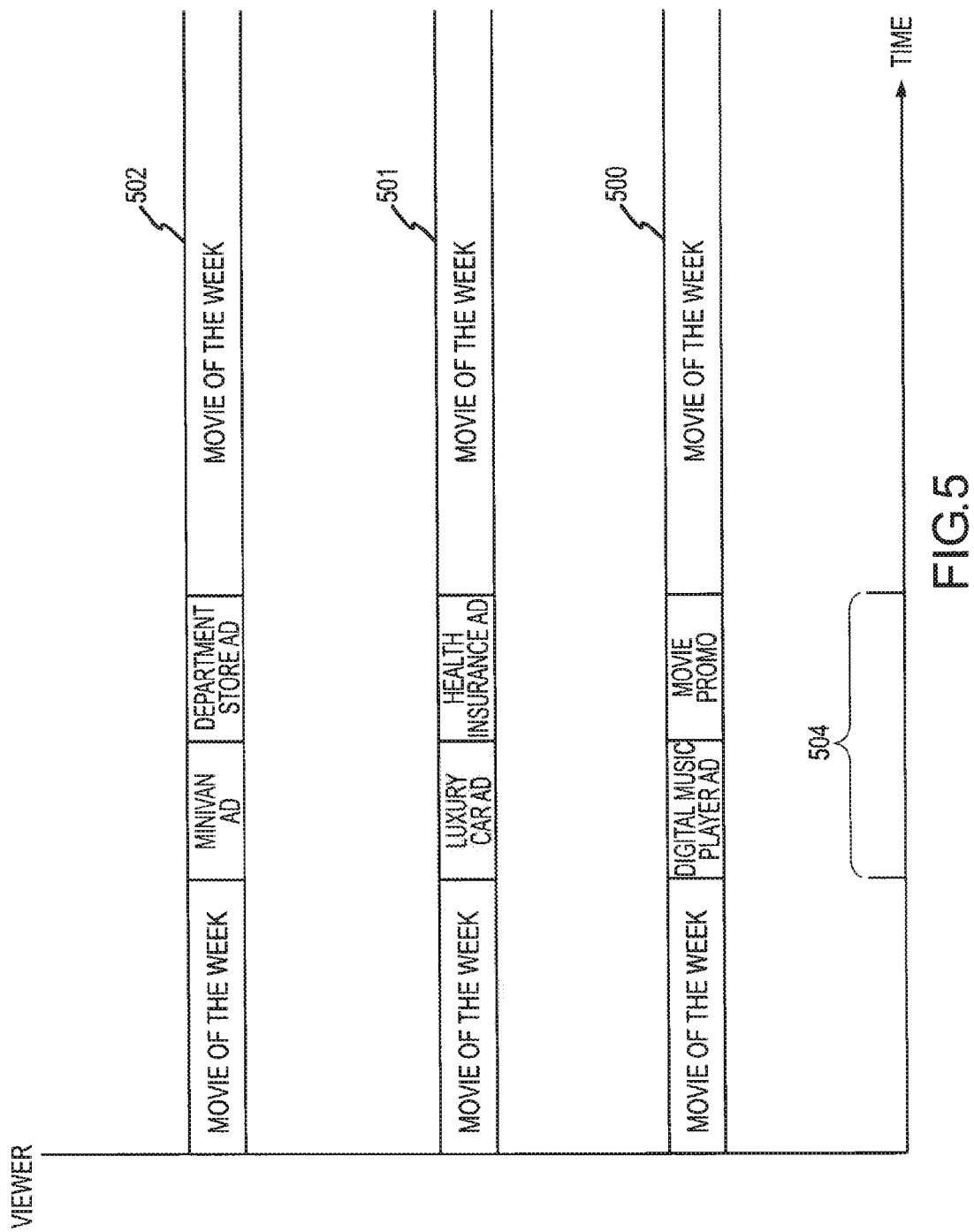
FIG. 5 illustrates delivery of assets to different users watching the same programming channel.
Figure 6:
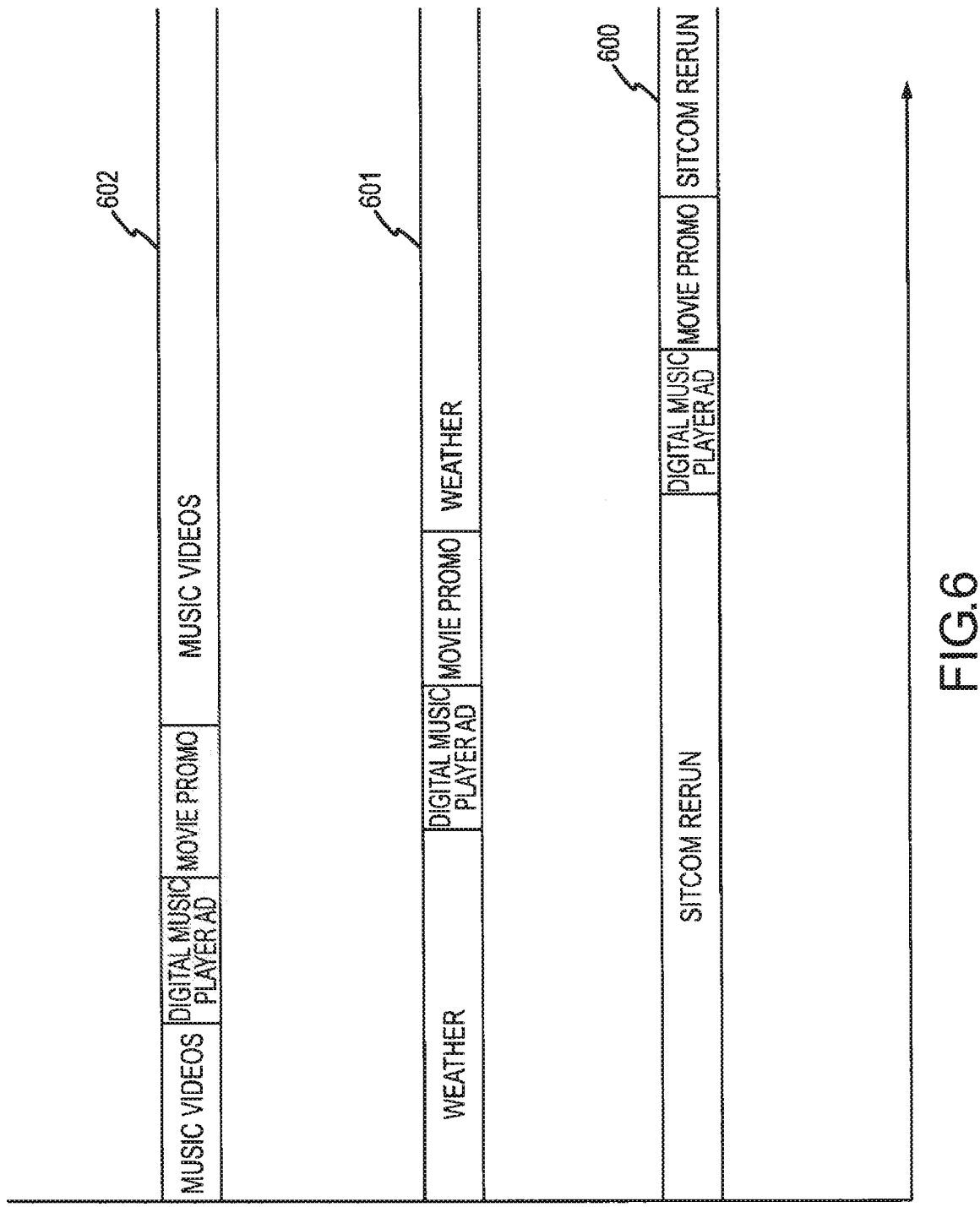
FIG. 6 illustrates audience aggregation across.

FIGS. 5 and 6 illustrate two different contexts of targeted asset delivery supported in accordance with the asset targeting system. Specifically, FIG. 5 illustrates the delivery of different assets, in this case ads, to different users watching the same programming channel, which may be referred to as spot optimization. As shown, three different users 500-502 are depicted as watching the same programming, in this case, denoted "Movie of the Week." At a given break 504 the users 500-502 each receive a different asset package. Specifically, user 500 receives a digital music player ad and a movie promo, user 501 receives a luxury car ad and a health insurance ad, and user 502 receives a minivan ad and a department store ad. Alternately, a single asset provider (e.g., a motor vehicle company) may purchase a spot and then provide different asset options for the spot (e.g., sports car, minivans, pickup trucks, etc.). Similarly, separate advertisers may collectively purchase a spot and then provide ads for their respective products (e.g., where the target audiences of the advertisers are complementary). It will be appreciated that these different asset packages may be targeted to different audience demographics. In this manner, assets are better tailored to particular viewers of a given program who may fall into different demographic groups. Thus, spot optimization refers to the delivery of different assets (by one or multiple asset providers) in a given spot.

FIG. 6 illustrates a different context of the present invention, which may be termed audience aggregation. In this case, three different users 600-602 viewing different programs associated with different channels may receive the same asset or asset package. In this case, each of the users 600-602 receives a package including a digital music player ad and a movie promo in connection with breaks associated with their respective channels. Though the users 600-602 are shown as receiving the same asset package for purposes of illustration, it is likely that different users will receive different combinations of assets due to differences in classification parameters. In this manner, users over multiple channels (some or all users of each channel) can be aggregated (relative to a given asset and time window) to define a virtual channel having significant user numbers matching a targeted audience classification. Among other things, such audience aggregation allows for the possibility of aggregating users over a number of low share channels to define a significant asset delivery opportunity, perhaps on the order of that associated with one of the high share networks. This can be accomplished, in accordance with the present invention, using equipment already at a user's premises (i.e., an existing UED). Such a virtual channel is graphically illustrated in FIG. 7, though this illustration is not based on actual numbers. Thus, audience aggregation refers to the delivery of the same asset in different spots to define an aggregated audience. These different spots may occur within a time window corresponding to overlapping (conflicting) programs on different channels. In this manner, it is likely that these spots, even if at different times within the window, will not be received by the same users.

Figure 8:
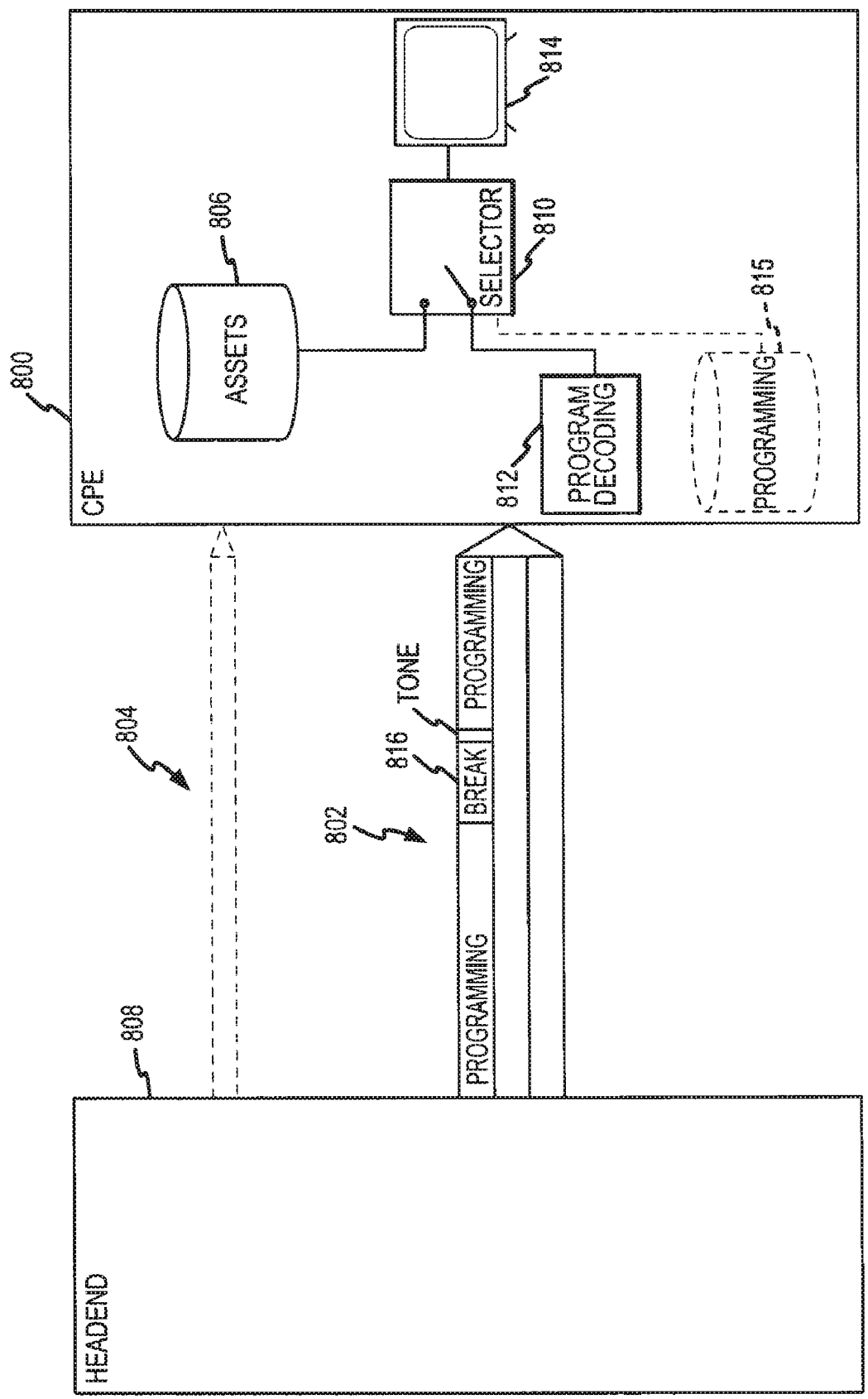
FIG. 8 illustrates targeted asset insertion being implemented at Customer Premises Equipment (UEDs).

Such targeting including both spot optimization and audience aggregation can be implemented using a variety of architectures in accordance with the asset targeting system. Thus, for example, as illustrated in FIG. 8, targeted asset insertion can be implemented at the UEDs. This may involve a forward-and-store functionality. As illustrated in FIG. 8, the UED 800 receives a programming stream 802 and an asset delivery stream 804 from the headend 808. These streams 802 and 804 may be provided via a common signal link such as a coaxial cable or via separate communications links. For example, the asset delivery stream 804 may be transmitted to the UED 800 via a designated segment, e.g., a dedicated frequency range, of the available bandwidth or via a programming channel that is opportunistically available for asset delivery, e.g., when it is otherwise off air. The asset delivery stream 804 may be provided on a continuous or intermittent basis and may be provided concurrently with the programming stream 802. In the illustrated example, the programming stream 802 is processed by a program decoding unit, such as DSTB, and programming is displayed on television set 814. Alternatively, the programming stream 802 may be stored in programming storage 815 for UED insertion.

In the illustrated implementation, the asset, together with metadata identifying, for example, any audience classification parameters of the targeted audience, is stored in a designated storage space 806 of the UED 800. It will be appreciated that substantial storage at the UED 800 may be required in this regard. For example, such storage may be available in connection with certain digital video recorder (DVR) units. A selector 810 is implemented as a processor running logic on the UED 800. The selector 810 functions analogously to the headend selector described above to identify breaks 816 and insert appropriate assets. In this case, the assets may be selected based on classification parameters of the household or, more preferably, a user within the household. Such information may be stored at the UED 800 or may be determined based on an analysis of viewing habits such as a click stream from a remote control as will be described in more detail below. Certain aspects of the present invention can be implemented in such a UED insertion environment.

Figure 9:
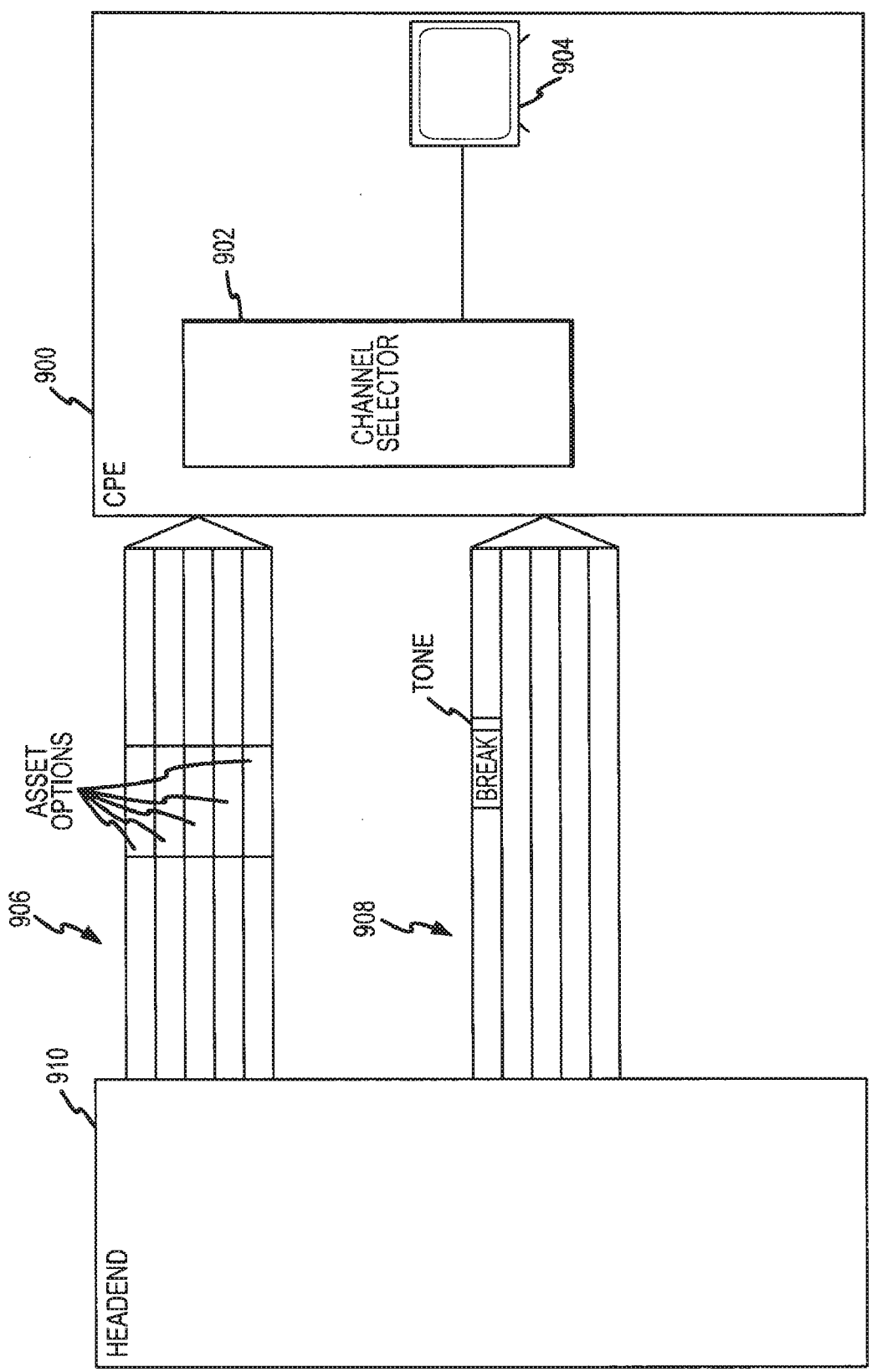
FIG. 9 illustrates asset options being transmitted from a headend on separate asset channels.

In FIG. 9, a different architecture is employed. Specifically, in FIG. 9, asset options transmitted from headend 910 synchronously with a given break on a given channel for which targeted asset options are supported. The UED 900 includes a channel selector 902 which is operative to switch to an asset channel associated with a desired asset at the beginning of a break and to return to the programming channel at the end of the break. The channel selector 902 may hop between channels (between asset channels or between an asset channel and the programming channel) during a break to select the most appropriate assets. In this regard, logic resident on the UED 900 controls such hopping to avoid switching to a channel where an asset is already in progress. As described below, this logic can be readily implemented, as the schedule of assets on each asset channel is known. Preferably, all of this is implemented invisibly from the perspective of the user of set 904. The different options may be provided, at least in part, in connection with asset channels 906 or other bandwidth segments (separate from programming channels 908) dedicated for use in providing such options. In addition, certain asset options may be inserted into the current programming channel 908. Associated functionality is described in detail below. The architecture of FIG. 9 has the advantage of not requiring substantial storage resources at the UED 900 such that it can be immediately implemented on a wide scale basis using equipment that is already in the field.

As a further alternative, the determination of which asset to show may be made at the headend. For example, an asset may be selected based on voting as described below, and inserted at the headend into the programming channel without options on other asset channels. This would achieve a degree of targeting but without spot optimization opportunities as described above. Still further, options may be provided on other asset channels, but the selection as between those channels may be determined by the headend. For example, information about a household or user (e.g., brand of car owned, magazines subscribed to, etc.) stored on the headend may be used to match an asset to a household or user. That information, which may be termed "marketing labels," may be used by the headend to control which asset is selected by the UED. For example, the UED may be instructed that it is associated with an "ACME preferred" customer. When an asset is disseminated with ACME preferred metadata, the UED may be caused to select that asset, thereby overriding (or significantly factoring with) any other audience classification considerations. However, it will be appreciated that such operation may entail certain concerns relating to sensitive information or may compromise audience classification based targeting in other respects.

A significant opportunity thus exists to better target users whom asset providers may be willing to pay to reach and to better reach hard-to-reach users. However, a number of challenges remain with respect to achieving these objectives including: how to provide asset options within network bandwidth limitations and without requiring substantial storage requirements and new equipment at the user's premises; how to obtain sufficient information for effective targeting while addressing privacy concerns; how to address a variety of business related issues, such as pricing of asset delivery, resulting from availability of asset options and attendant contingent delivery; and how to operate effectively within the context of existing network structure and systems (e.g., across node filters, using existing traffic and billing systems, etc.).

From the foregoing it will be appreciated that various aspects of the invention are applicable in the context of a variety of networks, including broadcast networks. In the following discussion, specific implementations of a targeted asset system are discussed in the context of a cable television network. Though the system enhances viewing for both analog and digital users, certain functionality is conveniently implemented using existing DSTBs. It will be appreciated that, while these represent particularly advantageous and commercially valuable implementations, the invention is not limited to these specific implementations or network contexts.

B. System Architecture

In one implementation, the system of the present invention involves the transmission of asset options in time alignment or synchronization with other assets on a programming channel, where the asset options are at least partially provided via separate bandwidth segments, e.g. channels at least temporarily dedicated to targeted asset delivery. Although such options may typically be transmitted in alignment with a break in programming, it may be desired to provide options opposite continuing programming (e.g., so that only subscribers in a specified geographic area get a weather announcement, an emergency announcement, election results or other local information while others get uninterrupted programming). Selection as between the available options may implemented at the user's premises, as by a DSTB in this implementation. In this manner, asset options are made available for better targeting, without the requirement for substantial storage resources or equipment upgrades at the user's premises (e.g., as might be required for a forward-and-store architecture). Indeed, existing DSTBs can be configured to execute logic for implementing the system described below by downloading and/or preloading appropriate logic.

Because asset options are synchronously transmitted in this implementation, it is desirable to be efficient in identifying available bandwidth and in using that bandwidth. Various functionality for improved bandwidth identification, e.g., identifying bandwidth that is opportunistically available in relation to a node filter. Efficient use of available bandwidth involves both optimizing the duty cycle or asset density of an available bandwidth segment (i.e., how much time, of the time a bandwidth segment is available for use in transmitting asset options, is the segment actually used for transmitting options) and the value of the options transmitted. The former factor is addressed, among other things, by improved scheduling of targeted asset delivery on the asset channels in relation to scheduled breaks of the programming channels.

Figure 10:
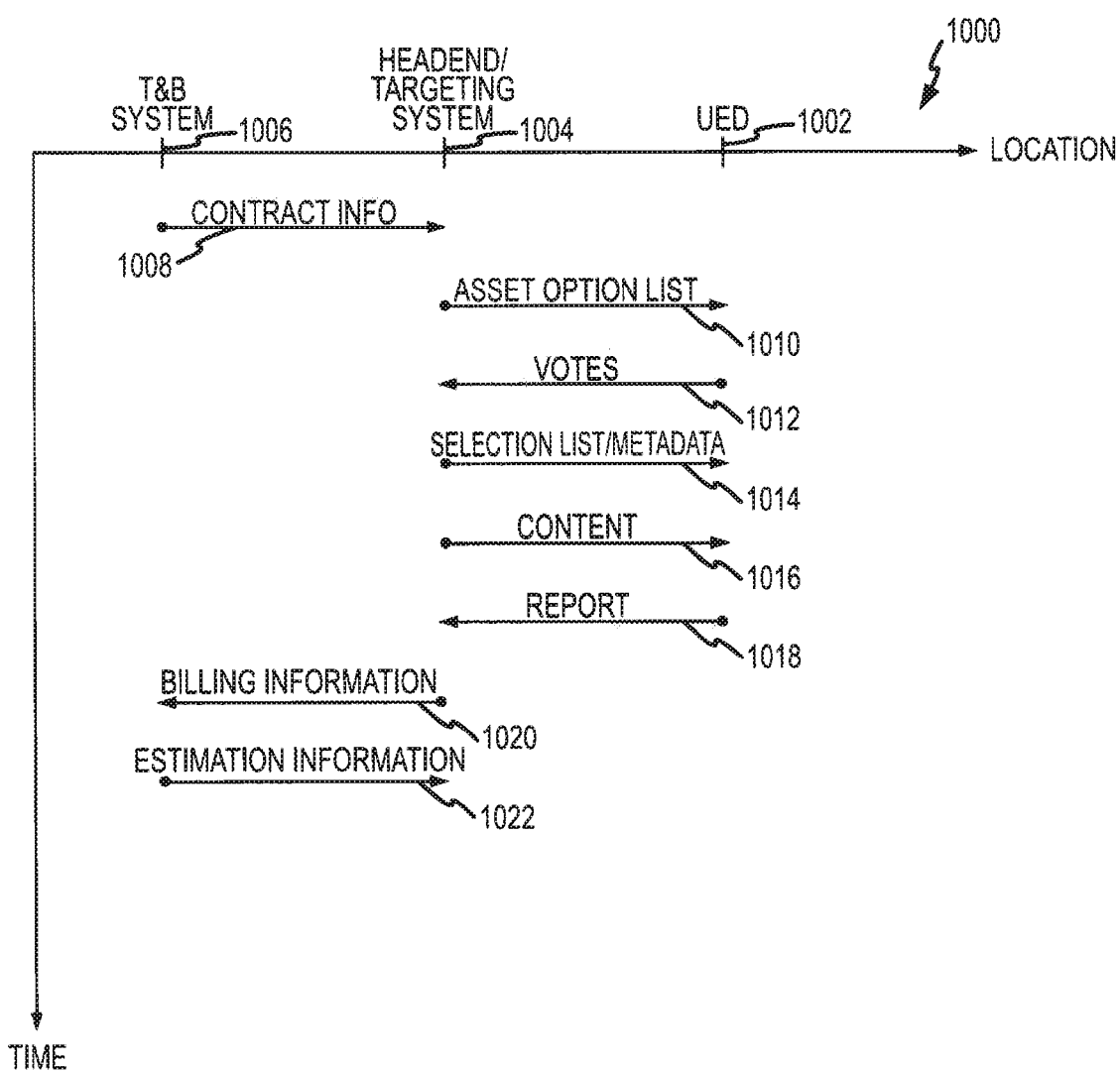
FIG. 10 illustrates a messaging sequence between a UED, a network platform, and a traffic and billing (T&B) system.

The latter factor is addressed in part by populating the available bandwidth spots with assets that are most desired based on current network conditions. These most desired assets can be determined in a variety of ways including based on conventional ratings. In the specific implementation described below, the most desired assets are determined via a process herein termed voting. FIG. 10 illustrates an associated messaging sequence 1000 in this regard as between a UED 1002 such as a DSTB, a network platform for asset insertion such as a headend 1004 and a traffic and billing (T&B) system 10006 used in the illustrated example for obtaining asset delivery orders or contracts and billing for asset delivery. It will be appreciated that the functionality of the T&B system 1006 may be split between multiple systems running on multiple platforms and the T&B system 1006 may be operated by the network operator or may be separately operated.

The illustrated sequence begins by loading contract information 1008 from the T&B system 1006 onto the headend 1004. An interface associated with system 1006 allows asset providers to execute contracts for dissemination of assets based on traditional time-slot buys (for a given program or given time on a given network) or based on a certain audience classification information (e.g., desired demographics, psychographics, geography, and/or audience size). In the latter case, the asset provider or network may identify audience classification information associated with a target audience. The system 1006 uses this information to compile the contract information 1008 which identifies the asset that is to be delivered together with delivery parameters regarding when and to whom the asset is to be delivered.

The illustrated headend 1004 uses the contract information together with a schedule of breaks for individual networks to compile an asset option list 1010 on a channel-by-channel and break-by-break basis. That is, the list 1010 lists the universe of asset options that are available for voting purposes for a given break on a given programming channel together with associated metadata identifying the target audience for the asset. e.g., based on audience classification information. The transmitted list 1010 may encompass all supported programming channels and may be transmitted to all participating users, or the list may be limited to one or a subset of the supported channels e.g., based on an input indicating the current channel or the most likely or frequent channels used by a particular user or group of users. The list 1010 is transmitted from the headend 1004 to the UED 1002 in advance of a break for which options are listed.

Based on the list 1010, the UED 1002 submits a vote 1012 back to the headend 1004. More specifically, the UED 1002 first identifies the classification parameters for the current user(s) and perhaps the current channel being watched, identifies the assets that are available for an upcoming break (for the current channel or multiple channels) as well as the target audience for those assets and determines a "fit" of one or more of those asset options to the current classification. In one implementation, each of the assets is attributed a fit score for the user(s), e.g., based on a comparison of the audience classification parameters of the asset to the putative audience classification parameters of the current user(s). This may involve how well an individual user classification parameter matches a corresponding target audience parameter and/or how many of the target audience parameters are matched by the user's classification parameters. Based on these fit scores, the UED 102 issues the vote 1012 indicating the most appropriate asset(s). Any suitable information can be used to provide this indication. For example, all scores for all available asset options (for the current channel or multiple channels) may be included in the vote 1012. Alternatively, the vote 1012 may identify a subset of one or more options selected or deselected by the UED 1002, with or without scoring information indicating a degree of the match and may further include channel information. In one implementation, the headend 1004 instructs UEDs (1002) to return fit scores for the top N asset options for a given spot, where N is dynamically configurable based on any relevant factor such as network traffic levels and size of the audience. Preferably, this voting occurs shortly before the break at issue such that the voting more accurately reflects the current status of network users. In one implementation, votes are only submitted for the programming channel to which the UED is set, and votes are submitted periodically, e.g., every fifteen minutes.

The headend 1004 compiles votes 1012 from UEDs 1002 to determine a set of selected asset options 1014 for a given break on a supported programming channel. As will be understood from the description below, such votes 1012 may be obtained from all relevant and participating UEDs 1002 (who may be representative of a larger audience including analog or otherwise non-participating users) or a statistical sampling thereof. In addition, the headend 1004 determines the amount of bandwidth, e.g., the number of dedicated asset option channels that are available for transmission of options in support of a given break for a given programming channel.

Based on all of this information, the headend 1004 assembles a flotilla of assets, e.g., the asset options having the highest vote values or the highest weighted vote values where such weighting takes into account value per user or other information beyond classification fit. Such a flotilla may include asset options inserted on the current programming channel as well as on asset channels, though different insertion processes and components may be involved for programming channel and asset channel insertion. It will be appreciated that some assets may be assembled independently or largely independently of voting, for example, certain public service spots or where a certain provider has paid a premium for guaranteed delivery. Also, in spot optimization contexts where a single asset provider buys a spot and then provides multiple asset options for that spot, voting may be unnecessary (though voting may still be used to select the options).

In one implementation, the flotilla is assembled into sets of asset options for each dedicated asset channel, where the time length of each set matches the length of the break, such that channel hopping within a break is unnecessary. Alternatively, the UED 1002 may navigate between the asset channels to access desired assets within a break (provided that asset starts on the relevant asset channels are synchronized). However, it will be appreciated that the flotilla matrix (where columns include options for a given spot and rows correspond to channels) need not be rectangular. Stated differently, some channels may be used to provide asset options for only a portion of the break, i.e., may be used at the start of the break for one or more spots but are not available for the entire break, or may only be used after one or more spots of a break have aired. A list of the selected assets 1014 and the associated asset channels is then transmitted together with metadata identifying the target audience in the illustrated implementation. It will be appreciated that it may be unnecessary to include the metadata at this step if the UED 1002 has retained the asset option list 1010. This list 1014 is preferably transmitted shortly in advance of transmission of the asset 1016 (which includes sets of asset options for each dedicated contact options channel used to support, at least in part, the break at issue).

The UED 1002 receives the list of selected asset options 1014 and associated metadata and selects which of the available options to deliver to the user(s). For example, this may involve a comparison of the current audience classification parameter values (which may or may not be the same as those used for purposes of voting) to the metadata associated with each of the asset options. The selected asset option is used to selectively switch the UED 1002 to the corresponding dedicated asset options channel to display the selected asset 1016 at the beginning of the break at issue. One of the asset option sets, for example, the one comprised of the asset receiving the highest vote values, may be inserted into the programming channel so that switching is not required for many users. Assuming that the voting UEDs are at least somewhat representative of the universe of all users, a significant degree of targeting is thereby achieved even for analog or otherwise nonparticipating users. In this regard, the voters serve as proxies for non-voting users. The UED 1002 returns to the programming channel at the conclusion of the break. Preferably, all of this is transparent from the perspective of the user(s), i.e., preferably no user input is required. The system may be designed so that any user input overrides the targeting system. For example, if the user changes channels during a break, the change will be implemented as if the targeting system was not in effect (e.g., a command to advance to the next channel will set the UED to the channel immediately above the current programming channel, without regard to any options currently available for that channel, regardless of the dedicated asset channel that is currently sourcing the television output).

In this system architecture, as in forward-and-store architectures or any other option where selections between asset options are implemented at the UED there will be some uncertainty as to how many users or households received any particular asset option in the absence of reporting. This may be tolerable from a business perspective. In the absence of reporting, the audience size may be estimated based on voting data, conventional ratings analysis and other tools. Indeed, in the conventional asset delivery paradigm, asset providers accept Nielsen rating estimates and demographic information together with market analysis to gauge return on investment. However, this uncertainty is less than optimal in any asset delivery environment and may be particularly problematic in the context of audience aggregation across multiple programming networks, potentially including programming networks that are difficult to measure by conventional means.

The system of the present invention preferably implements a reporting system by which individual UEDs 1002 report back to the headend 1004 what asset or assets were delivered at the UED 1002 and, optionally, to whom (in terms of audience classification). Additionally, the reports may indicate where (on what programming channel) the asset was delivered and how much (if any) of the asset was consumed. Such reports 1018 may be provided by all participating UEDs 1002 or by a statistical sampling thereof. These reports 1018 may be generated on a break-by-break basis, periodically (e.g., every 15 minutes) or may be aggregated prior to transmission to the headend 1004. Reports may be transmitted soon after delivery of the assets at issue or may be accumulated, e.g., for transmission at a time of day where messaging bandwidth is more available. Moreover, such reporting may be coordinated as between the UEDs 1002 so as to spread the messaging load due to reporting.

In any case, the reports 1018 can be used to provide billing information 1020 to the T&B system 1006 for valuing the delivery of the various asset options. For example, the billing information 1020 can be used by the T&B system 1006 to determine how large an audience received each option and how well that audience matched the target audience. For example, as noted above, a fit score may be generated for particular asset options based on a comparison of the audience classification to the target audience. This score may be on any scale, e.g., 1-100. Goodness of fit may be determined based on this raw score or based on characterization of this score such as "excellent," "good," etc. Again, this may depend on how well an individual audience classification parameter of a user matches a corresponding target audience parameter and/or how many of the target audience parameters are matched by the user's audience classification parameters. This information may in turn be provided to the asset provider, at least in an aggregated form. In this manner, the network operator can bill based on guaranteed delivery of targeted messages or scale the billing rate (or increase delivery) based on goodness of fit as well as audience size. The reports (and/or votes) 1018 can also provide a quick and detailed measurement of user distribution over the network that can be used to accurately gauge ratings, share, demographics of audiences and the like. Moreover, this information can be used to provide future audience estimation information 1022, for example, to estimate the total target universe based on audience classification parameters.

It will thus be appreciated that the present invention allows a network operator such as an MSO to sell asset delivery under the conventional asset delivery (time-slot) buy paradigm or under the new commercial impression paradigm or both. For example, a particular MSO may choose to sell asset delivery space for the major networks (or for these networks during prime time) under the old time-slot buy paradigm while using the commercial impression paradigm to aggregate users over multiple low market share networks. Another MSO may choose to retain the basic time-slot buy paradigm while accommodating asset providers who may wish to fill a given slot with multiple options targeted to different demographics. Another MSO may choose to retain the basic time-slot buy paradigm during prime time across all networks while using the targeted impression paradigm to aggregate users at other times of the day. The targeted impression paradigm may be used by such MSOs only for this limited purpose.

Figure 11:
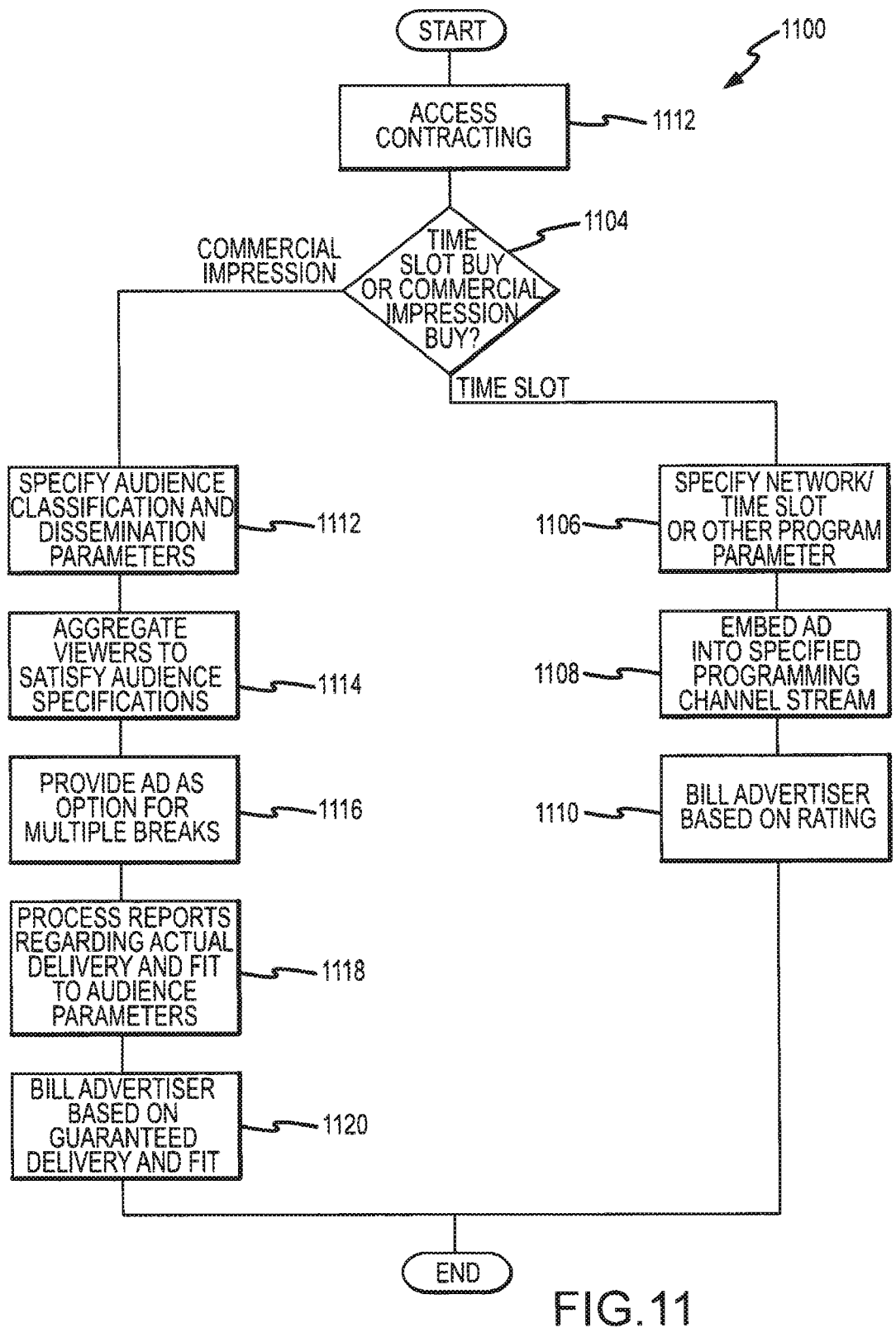
FIG. 11 is a flow chart illustrating a process for implementing time-slot and targeted impression buys.

FIG. 11 is a flow chart illustrating an associated process 1100. An asset provider (or agent thereof) can initiate the illustrated process 1100 by accessing (1102) a contracting platform as will be described below. Alternatively, an asset provider can work with the sales department or other personnel of a system operator or other party who accesses such a platform. As a still further alternative, an automated buying system may be employed to interface with such a platform via a system-to-system interface. This platform may provide a graphical user interface by which an asset provider can design a dissemination strategy (e.g., an ad campaign) and enter into a corresponding contract for dissemination of an asset. The asset provider can then use the interface to select (1104) to execute either a time-slot buy strategy or a targeted impression buy strategy. In the case of a time-slot buy strategy, the asset provider can then use the user interface to specify (1106) a network and time-slot or other program parameter identifying the desired air times and frequency for delivery of the asset. Thus, for example, an asset provider may elect to air the asset in connection with specifically identified programs believed to have an appropriate audience. In addition, the asset provider may specify that the asset is to appear during the first break or during multiple breaks during the program. The asset provider may further specify that the asset is to be, for example, aired during the first spot within the break, the last spot within the break or otherwise designate the specific asset delivery slot.

Once the time-slots for the asset have thus been specified, the MSO causes the asset to be embedded (1108) into the specified programming channel asset stream. The asset is then available to be consumed by all users of the programming channel. The MSO then bills (1110) the asset provider, typically based on associated ratings information. For example, the billing rate may be established in advance based on previous rating information for the program in question, or the best available ratings information for the particular airing of the program may be used to bill the asset provider. It will thus be appreciated that the conventional time-slot buy paradigm is limited to delivery to all users for a particular time-slot on a particular network and does not allow for targeting of particular users of a given network or targeting users distributed over multiple networks in a single buy.

In the case of targeted impression buys, the asset provider can use the user interface as described in more detail below to specify (1112) audience classification and other dissemination parameters. In the case of audience classification parameters, the asset provider may specify the gender, age range, income range, geographical location, lifestyle interest or other information of a targeted audience. The additional dissemination parameters may relate to delivery time, frequency, audience size, or any other information useful to define a target audience. Combinations of parameters may also be specified. For example, an asset provider may specify an audience size of 100,000 in a particular demographic group and further specify that the asset is not delivered to any user who has already received the asset a predetermined number of times.

Based on this information, the targeted asset system of the present invention is operative to target appropriate users. For example, this may involve targeting only selected users of a major network. Additionally or alternatively, this may involve aggregating (1114) users across multiple networks to satisfy the audience specifications. For example, selected users from multiple programming channels may receive the asset within a designated time period in order to provide an audience of the desired size, where the audience is composed of users matching the desired audience classification. The user interface preferably estimates the target universe based on the audience classification and dissemination parameters such that the asset provider receives an indication of the likely audience size.

The aggregation system may also be used to do time of day buys. For example, an asset provider could specify audience classification parameters for a target audience and further specify a time and channel for airing of the asset. UEDs tuned to that channel can then select the asset based on the voting process as described herein. Also, asset providers may designate audience classification parameters and a run time or time range, but not the programming channel. In this manner, significant flexibility is enabled for designing a dissemination strategy. It is also possible for a network operator to disable some of these strategy options, e.g., for business reasons.

Based on this input information, the targeted asset system of the present invention is operative to provide the asset as an option during one or more time-slots of one or more breaks. In the case of spot optimization, multiple asset options may be disseminated together with information identifying the target audience so that the most appropriate asset can be delivered at individual UEDs. In the case of audience aggregation, the asset may be provided as an option in connection with multiple breaks on multiple programming channels. The system then receives and processes (1118) reports regarding actual delivery of the asset by UEDs and information indicating how well the actual audience fit the classification parameters of the target audience. The asset provider can then be billed (1120) based on guaranteed delivery and goodness of fit based on actual report information. It will thus be appreciated that a new asset delivery paradigm is defined by which assets are targeted to specific users rather than being associated with particular programs. This enables both better targeting of individual users for a given program and improved reach to target users on low-share networks.

From the foregoing, it will be appreciated that various steps in the messaging sequence are directed to matching assets to users based on classification parameters, allowing for goodness of fit determinations based on such matching or otherwise depending on communicating audience classification information across the network. It is preferable to implement such messaging in a manner that is respectful of user privacy concerns and relevant regulatory regimes.

Much of the discussion above has referenced audience classification parameters as relating to individuals as opposed to households. Methods for identifying audience classification parameters are set forth in co-pending U.S. application Ser. No. 11/332,771, entitled, "VOTING AND HEADEND INSERTION," the contents of which are incorporated herein by reference. In a first implementation, logic associated with the UED uses probabilistic modeling, fuzzy logic and/or machine learning to progressively estimate the audience classification parameter values of a current user or users based on the click stream. This process may optionally be supplemental based on stored information (preferably free of sensitive information) concerning the household that may, for example, affect probabilities associated with particular inputs. In this manner, each user input event (which involves one or more items of change of status and/or duration information) can be used to update a current estimate of the audience classification parameters based on associated probability values. The fuzzy logic may involve fuzzy data sets and probabilistic algorithms that accommodate estimations based on inputs of varying and limited predictive value.

In a second implementation, the click stream is modeled as an incomplete or noisy signal that can be processed to obtain audience classification parameter information. More specifically, a series of clicks over time or associated information can be viewed as a time-based signal. This input signal is assumed to reflect a desired signature or pattern that can be correlated to audience classification parameters. However, the signal is assumed to be incomplete or noisy—a common problem in signal processing. Accordingly, filtering techniques are employed to estimate the "true" signal from the input stream and associated algorithms correlate that signal to the desired audience classification information. For example, a nonlinear adaptive filter may be used in this regard.

One of the audience classifications that may be used for targeting is location. Specifically, an asset provider may wish to target only users within a defined geographic zone (e.g., proximate to a business outlet) or may wish to target different assets to different geographic zones (e.g., targeting different car ads to users having different supposed income levels based on location). In certain implementations, the present invention determines the location of a particular UED and uses the location information to target assets to the particular UED. It will be appreciated that an indication of the location of a UED contains information that may be considered sensitive. The present invention also creates, extracts and/or receives the location information in a manner that addresses these privacy concerns. This may also be accomplished by generalizing or otherwise filtering out sensitive information from the location information sent across the network. This may be accomplished by providing filtering or sorting features at the LED or at the headend. For example, information that may be useful in the reporting process (i.e. to determine the number of successful deliveries within a specified location zone) may be sent upstream with little or no sensitive information included. Additionally, such location information can be generalized so as to not be personally identifiable. For example, all users on a given block or within another geographic zone (such as associated with a zip plus 2 area) may be associated with the same location identifier (e.g., a centroid for the zone).

Similarly, it is often desired to associate tags with asset selections. Such tags are additional information that is superimposed on or appended to such assets. For example, a tag may provide information regarding a local store or other business location at the conclusion of an asset that is distributed on a broader basis. Conventionally, such tags have been appended to ads prior to insertion at the headend and have been limited to coarse targeting. In accordance with the present invention, tags may be targeted to users in particular zones, locations or areas, such as neighborhoods. Tags may also be targeted based on other audience classification parameters such as age, gender, income level, etc. For example, tags at the end of a department store ad may advertise specials on particular items of interest to particular demographics. Specifically, a tag may be included in an asset flotilla and conditionally inserted based on logic contained within the UED 1101. Thus the tags are separate units that can be targeted like other assets, however, with conditional logic such that they are associated with the corresponding asset.

Targeting may also be implemented based on marketing labels. Specifically, the headend may acquire information or marketing labels regarding a user or household from a variety of sources. These marketing labels may indicate that a user buys expensive cars, is a male 18-24 years old, or other information of potential interest to an asset provider. In some cases, this information may be similar to the audience classification parameters, though it may optionally be static (not varying as television users change) and based on hard data (as opposed to being surmised based on viewing patterns or the like). In other cases, the marketing labels may be more specific or otherwise different than the audience classification. In any event, the headend may inform the UED as to what kind of user/household it is in terms of marketing labels. An asset provider can then target an asset based on the marketing labels and the asset will be delivered by UEDs where targeting matches. This can be used in audience aggregation and spot optimization contexts.

Thus, the targeted asset system of the present invention allows for targeting of assets in a broadcast network based on any relevant audience classification, whether determined based on user inputs such as a click stream, based on marketing labels or other information pushed to the customer premises equipment, based on demographic or other information stored or processed at the headend, or based on combinations of the above or other information. In this regard, it is therefore possible to use, in the context of a broadcast network, targeting concepts that have previously been limited to other contexts such as direct mail. For example, such targeting may make use of financial information, previous purchase information, periodical subscription information and the like. Moreover, classification systems developed in other contexts, may be leveraged to enhance the value of targeting achieved in accordance with the present invention.

An overview of the system has thus been provided, including introductory discussions of major components of the system, which provides a system context for understanding the operation of those components.

III. COMPONENT OVERVIEW

A. Measurement and Voting

Generally, signals received from a UED 1002 are utilized by the present systems and methods for at least three separate applications, which in some instances may also be combined. See FIG. 10. These applications may be termed measurement, voting and reporting. Reporting is described in more detail below. Measurement relates to the use of the signals to identify the audience size and, optionally, the classification composition of the audience. This information assists in estimating the universe of users available for targeting, including an estimate of the size and composition of an audience that may be aggregated over multiple channels (e.g., including low share channels) to form a substantial virtual channel. Accordingly, a targeted asset may be provided for the virtual channel to enhance the number of users who receive the asset. Voting involves the use of signals received from UEDs 1012 to provide an asset based on asset performance indications from the UEDs. In any case, assets may be selected and inserted into one or more transmitted data streams based on signals received from one or more UEDs.

Figure 7:
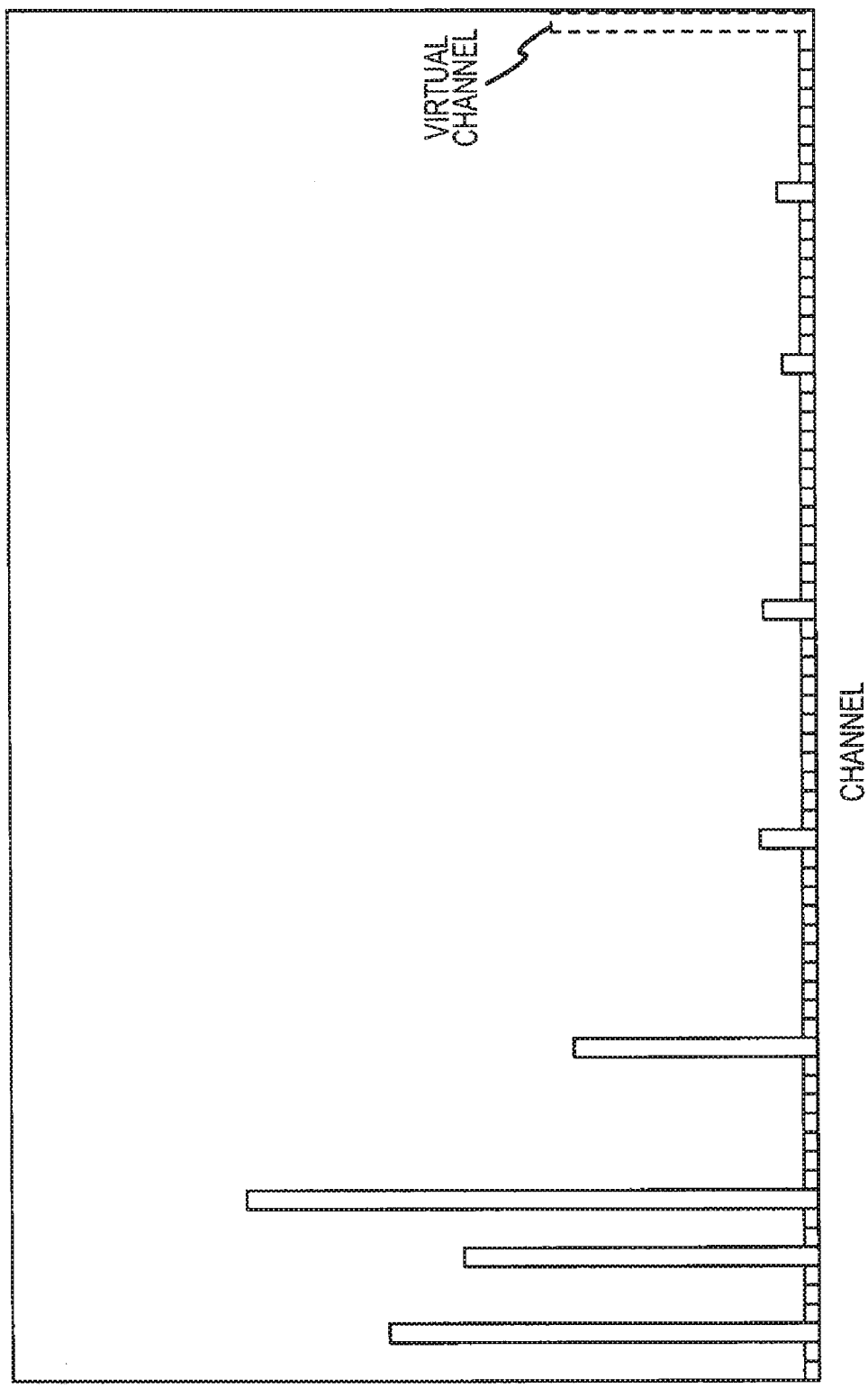
FIG. 7 illustrates a virtual channel in the context of audience aggregation.

With regard to audience measurement, the two-way communication between the headend and UED allows for gathering information which may indicate, at least implicitly, information regarding audience size and audience classification composition. In this regard, individual UEDs may periodically or upon request provide a signal to the headend indicating, for example, that an individual UED is active and what channel is currently being displayed by the UED. This information, which may be provided in connection with voting, reporting on other messages (e.g., messages dedicated to measurement) can be used to infer audience size and composition. Wholly apart from the targeted asset system, such information may be useful to support ratings and share information or for any other audience measurement objective. Referring briefly to FIG. 7, it is noted that of the available programming channels, four programming channels have the largest individual share of users (e.g., the four major networks). However, there are numerous other users in the network albeit in smaller shares of the total on a channel-by-channel basis. By providing a common set of asset options to the users of two or more of the programming channels having a small market share (or even to users of programming channels with large shares), a virtual channel may be created. That is, a common asset option or set of asset options may be provided to an aggregated group from multiple programming channels. Once combined, the effective market share of a virtual channel composed of users from small share channels may approximate the market share of, for example, one of the four major networks.

Figure 12:
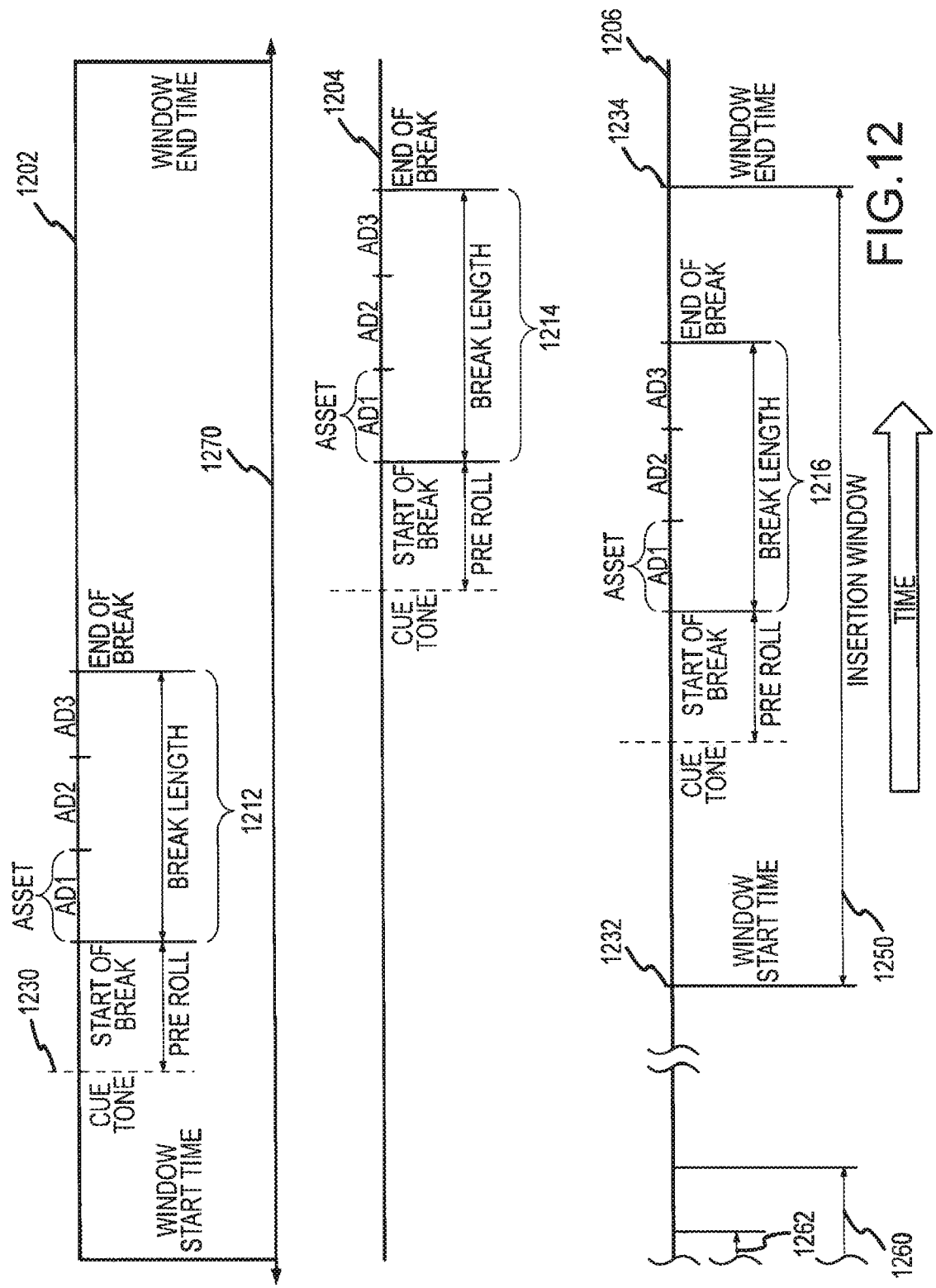
FIG. 12 illustrates exemplary sequences associated with breaks on programming channels.

While the aggregation of the users of multiple programming channels into a virtual channel allows for providing a common set of asset options to each of the programming channels, it will be appreciated that the asset will generally be provided for each individual programming channel at different times. This is shown in FIG. 12 where two different programming channels (e.g., 1202 and 1204), which may be combined into a virtual channel, have different scheduled breaks 1212, 1214. In this regard, an asset may be provided on the first channel 1202 prior to when the same asset is provided on the second channel 1204. However, this common asset may still be provided within a predetermined time window (e.g., between 7 p.m. and 8 p.m.). In this regard, the asset may be delivered to the aggregated market share represented by the virtual channel (or a subset thereof) within defined constraints regarding delivery time. Alternatively, the size of such an aggregated audience may be estimated in advance based on previous reporting, ratings and census data, or any other technique. Thus measurement or voting is not necessary to accomplish targeting, though such detailed asset information is useful. Actual delivery may be verified by subsequent reporting. As will be appreciated, such aggregation allows a network operator to disseminate assets based on the increased market share of the virtual channel(s) in relation to any one of the subsumed programming channels, as well as allowing an asset provider to more effectively target a current viewing audience.

Figure 13:
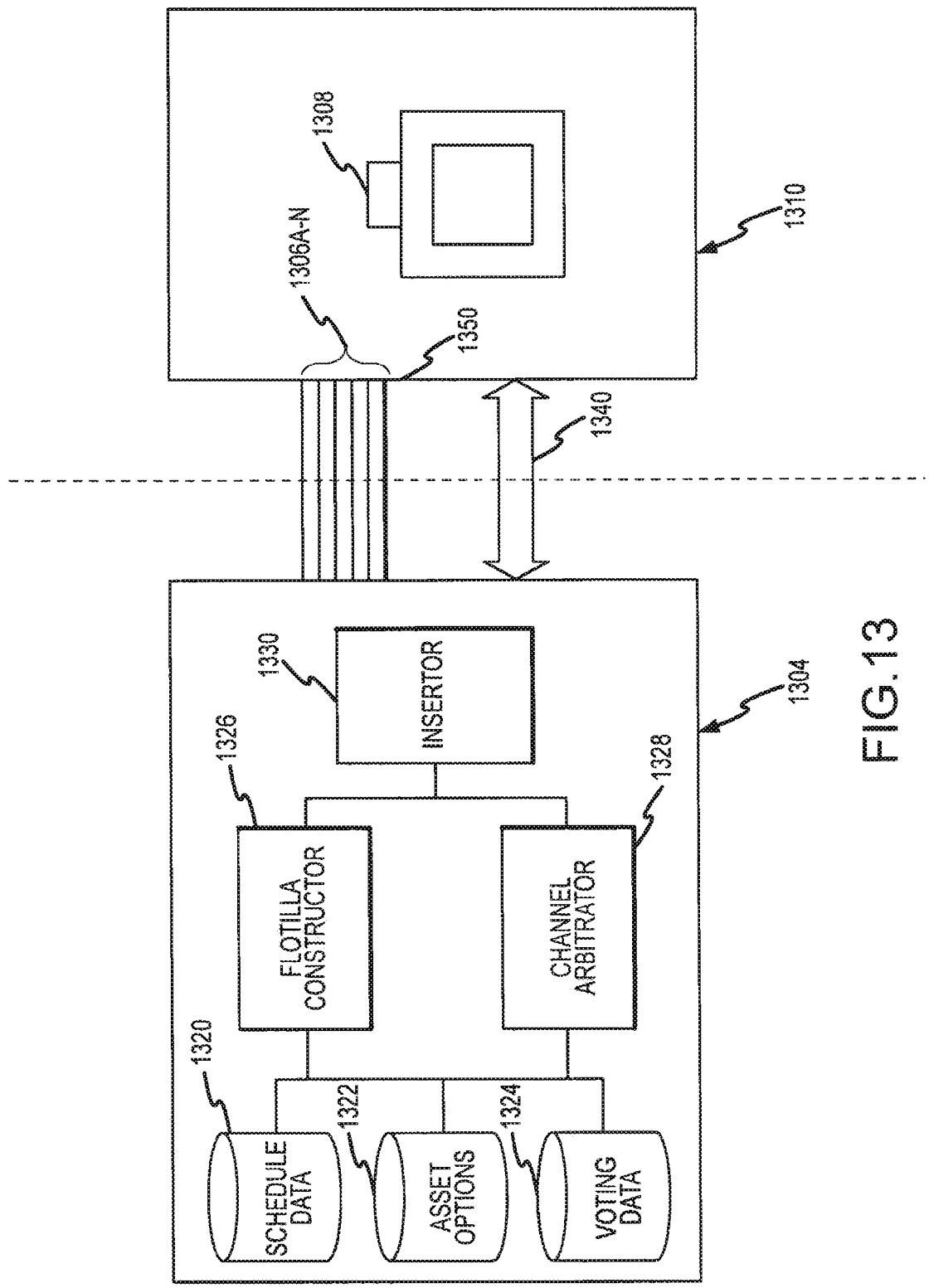
FIG. 13 illustrates an application that is supported by signals from UEDs and which provides targeted assets to users of one or more channels within a network.

Another application that is supported by signals from UEDs is the provision of targeted assets to current users of one or more channels within the network, e.g., based on voting. Such an application is illustrated in FIG. 13, where, in one arrangement, signals received from UEDs 130 (only one shown) may be utilized to select assets (e.g., a break asset and/or programming) for at least one programming channel 1350. In this regard, such assets may be dynamically selected for insertion into the data stream of the programming channel 1350, for example, during a break or other designated time period. In a further arrangement, unused bandwidth of the network is utilized to provide parallel asset streams during a break or designated time period of the targeted channel 1350. In the context of a break, multiple asset channels 1360A-N may be used to provide asset options during a single break, wherein each asset channel 1360A-N may provide options directed to different groups of viewers and/or otherwise carry different assets (e.g., users having similar audience classification parameters may receive different assets due to a desired sequencing of packaged assets as discussed below).

In such an arrangement, the UED 1310 may be operative to select between alternate asset channels 1360A-N based on the signals from the UED 1360. In addition to targeted audience aggregation, such a system may be desirable to enhance revenues or impact for programming, including large share programming (spot optimization). That is, a single break may be apportioned to two or more different asset providers, or, a single asset provider may provide alternate assets where the alternate assets target different groups of users. Though discussed herein as being directed to providing different break or interstitial assets to different groups of users, it should be noted that the system may also be utilized to provide different programming assets.

An associated asset targeting system implementing a voting process is also illustrated in FIG. 13. The asset targeting system of FIG. 13 has a platform 1304, which includes a structure of the network (i.e., upstream from the users/households) that is operative to communicate with UEDs 1310 (only one shown) within the network. The illustrated UED 1310 includes a signal processing device 1308, which in the present illustration is embodied in a DSTB. Generally, the platform 1304 is operative to communicate with the UED 1310 via a network interface 1340. In order to provide parallel asset channels 1360A-N during a break of a programming channel, e.g., channel 1350, the platform 1304 is in communication with one or more of the following components: a schedule database 1320, an available asset option database 1322, voting database 1324, a flotilla constructor 1326, a channel arbitrator 1328, and an inserter 1330. Of note, the listed components 1320-1330 do not have to be located at a common network location. That is, the various components of the platform 1304 may be distributed over separate locations within the network and may be interconnected by any appropriate communication interfaces.

Generally, the schedule database 1320 includes information regarding the timing of breaks for one or more programming channels, the asset option database 1322 includes available asset metadata identifying the asset and targeted audience classification parameters, and the voting database 1324 includes voting information obtained from one or more UEDs for use in targeting assets. The actual assets are generally included in a separate database (not shown). The flotilla constructor 1326 is utilized to populate a break of a programming channel and/or asset channels 1360A-N with selected assets. The channel arbitrator 1328 is utilized to arbitrate the use of limited bandwidth (e.g., available asset channels 1360A-N) when a conflict arises between breaks of two or more supported programming channels. Finally, the inserter 1330 is utilized to insert selected assets or targeted assets into an asset stream (e.g., of a programming channel 1350 and/or one or more asset channels 1360A-N) prior to transmitting the stream across the network interface 1340. As will be discussed herein, the system is operative to provide asset channels 1360A-N to support asset options for breaks of multiple programming channels within the network.

In order to provide asset channels 1360A-N for one or more programming channels, the timing of the breaks on the relevant programming channels is determined. For instance, FIG. 12 illustrates three programming channels that may be provided by the network operator to a household via a network interface. As will be appreciated, many more channels may also be provided. The channels 1202, 1204 and 1206 comprise three programming streams for which targeted assets are provided. Users may switch between each of these channels 1202, 1204 and 1206 (and generally many more) to select between programming options. Each channel 1202, 1204 and 1206 includes a break 1212, 1214 and 1216, respectively, during the programming period shown. During breaks 1212-1216 one or more asset spots are typically available. That is, a sequence of shorter assets may be used to fill the 90-second break. For example, two, three or four spots may be defined on a single channel for a single break. Different numbers of spots or avails may be provided for the same break on different channels and a different number of channels may be used for different portions of the break.

In order to provide notice of upcoming breaks or insertion opportunities within a break, programming streams often include a cue tone signal 1230 (or a cue message in digital networks) a predetermined time before the beginning of each break or insertion opportunity. These cue tone signals 1230 have historically been utilized to allow local asset providers to insert localized assets into a network feed. Further, various channels may provide window start times and window end times during which one or more breaks will occur. These start and end times define an avail window. Again, this information has historically been provided to allow local asset providers to insert local assets into a broadcast stream. This information may also be utilized by the targeted asset system to determine when a break will occur during programming. Accordingly, the system may be operative to monitor programming channels, e.g., 1202, 1204 and 1206, for cue tone signals 1230 as well as obtain and store information regarding window start and end times (e.g., in the schedule database 1320). The available window information may be received from the T&B system and may be manually entered.

Referring again to FIG. 13, the use of signals from the UED 1310 may allow for providing assets that are tailored to current users or otherwise for providing different assets to different groups of users. In this regard, an asset that has targeting parameters that match the classification parameters of the greatest number of users may be provided within the broadcast stream of a supported programming channel 1350 during a break. It is noted that the most appropriate asset may thereby be provided to analog or otherwise nonparticipating users (assuming the voters are representative of the relevant user universe), yielding a degree of targeting even for them. Moreover, some targeting benefit can be achieved for a large number of programming channels, even channels that may not be supported by asset channels with respect to a given break.

Alternatively or additionally, different assets may be provided on the asset channels 1360A-N during the break of a programming channel. During a break where asset channels 136A-N are available, a UED 1310 of a particular household may, based on a determination implemented at the UED 1310, switch to one of the asset channels 1360A-N that contains appropriate assets. Accordingly, such assets of the asset channel 1360A-N may be displayed during the break. During the break, the UED 1310 may stay on one asset channel 1360A-N (in the case of a break with multiple spots in sequence) or may navigate through the break selecting the most appropriate assets. After the break, the UED 1310 may switch back to the original programming channel (if necessary). This switching may occur seamlessly from the point of view of a user. In this regard, different assets may be provided to different users during the same break. As will be appreciated, this allows asset providers to target different groups during the same break. Further it allows for a network operator to market a single spot to two different asset providers on an apportioned basis (or allow a single asset provider to fill a single spot with multiple asset options). Each asset provider may, for example, thereby pay for an audience that better matches its target.

Figure 14:
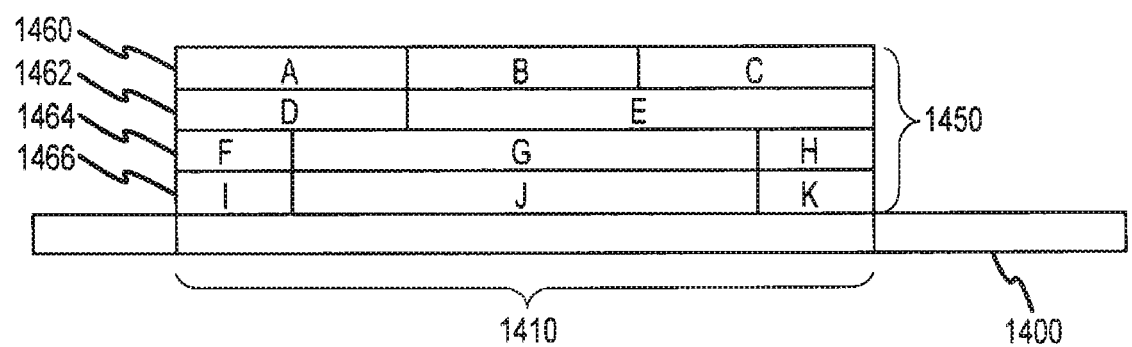
FIG. 14 illustrates the use of asset channels for providing assets during a break of a programming channel.

FIG. 14 illustrates the use of four asset channels 1401-1404 for providing a flotilla of assets during a break 1410 of a programming channel 1400. As shown, on each asset channel 1401-1404, the break 1410 may be separated into one or more asset slots that may have different durations. However, in the case of FIG. 14, the start and end times of the asset sets A-C, D-E, F-H and I-K carried by the asset channels 1401-1404 are aligned with the start and end times of the break 1410. Each of the asset channels 1401-1404 may carry an asset that is targeted to a specific audience classification of the users of the targeted channel 1400 or the users of additional programming channels having a break aligned with the break 1410 of the programming channel 1400.

It should be noted that flotillas need not be rectangular as shown in FIG. 14. That is, due to conflicts between breaks or the intermittent availability of certain asset channels as discussed above, the total number of asset channels used to support a given programming channel may change during a break. Each asset channel 1401-1404 includes a different combination of assets A-K that may be targeted to different viewers of the channel 1400 during a given break 1410. Collectively, the assets A-K carried by the asset channels 1401-1404 define a flotilla 1405 that includes assets that may be targeted to different groups of users. The most appropriate assets for a given user may be on different ones of the channels 1401-1404 at different times during the break 1410. These can be delivered to the user by channel hopping during the break with due consideration given to the fact that spots on different channels 1401-1404 may not have the same start and end times. Selection of assets to fill a break of a programming channel, or to fill the available spots within each asset channel of a flotilla may be based on votes of users of the programming channel. That is, assets may be selected by the flotilla constructor 1326 (See FIG. 13) in response to signals received from UEDs 1310 within the network. Such selection may be performed as set forth in co-pending U.S. application Ser. No. 11/332,771, which is incorporated by reference herein.

It is also desirable that each customer premises equipment device be able to navigate across a break selecting assets that are appropriate for the current user. For example, a flotilla may include a number of columns correspondent to a sequence of asset spots for a break. If one column included all assets directed to children, non-children users would be left without an appropriate asset option for that spot. Thus, options for avoiding such situations include making sure that a widely targeted asset is available in each column or time period, or that the union of the subsets defined by the targeting constraints for each asset in a column or time period represents the largest possible subset of the universe of users. Of course, this may conflict with other flotilla construction goals and an optimal solution may need to be arbitrated. In addition, where an issue arises as to which assets to include in a flotilla, the identity of the relevant asset providers may be considered (e.g., a larger volume asset provider or an asset provider who has paid for a higher level of service may be given preference).

To enable the UED to switch to a designated asset channel for a break (or, for certain implementations, between asset options within the flotilla during a break) metadata may be provided in connection with each asset channel(s) and/or programming channel(s). As will be appreciated, each individual asset channel is a portion of an asset stream having a predetermined bandwidth. These asset channels may be further broken into in-band and out-of-band portions. Generally, the in-band portion of the signal supports the delivery of an asset stream (e.g., video). Triggers may be transmitted via the out-of-band portion of a channel. Further, such out-of-band portions of the bandwidth may be utilized for the delivery of the asset option list as well as a return path for use in collecting votes and reporting information from the UED. More generally, it will be appreciated that in the various cases referenced herein where messaging occurs between the UED and a network platform, any appropriate messaging channels may be used including separate IP or telephony channels.

Based on the metadata, the UED may select individual assets or asset sets depending on the implementation. Thus, in certain implementations, the UED may select an asset for the first time-slot of a break that best corresponds to the audience classification of the current user. This process may be repeated for each time-slot within a break. Alternatively, an asset flotilla may include a single metadata set for each asset channel and the UED may simply select one asset channel for an entire break.

Alternatively, asset options may be provided via a forward-and-store architecture in the case of UEDs with substantial storage resources, e.g., DVRs. In this regard, an asset may be inserted into a designated bandwidth segment and downloaded via the network interface to the storage of the UED. Accordingly, the UED may then selectively insert the asset from the storage into a subsequent break. Further, in this architecture, the assets of the stored options and associated metadata may include an expiration time. Assets may be discarded (e.g., deleted) upon expiration regardless of whether they have been delivered. In this architecture, it will be appreciated that the transmission of assets does not have a real-time component, so the available bandwidth may vary during transmission. Moreover, a thirty second asset may be transmitted in five seconds or over thirty minutes. The available assets may be broadcast to all UEDs with individual UEDs only storing appropriate assets. In addition, due to storage limitations, a UED may delete an asset of interest and re-record it later.

In contrast, in the asset channel architecture, the flotilla is transmitted in synchronization with the associated break and requires little or no storage at the UED. In either case, once an asset from the storage or flotilla is displayed, each UED may provide an asset delivery notification (ADN) to the network platform indicating that the particular asset was delivered. The platform may then provide aggregated or compiled information regarding the total number of users that received a given asset to a billing platform. Accordingly, individual asset providers may be billed in accordance with how many users received a given asset.

B. Dynamic Scheduling

As noted above, the system allows for dynamically inserting assets in support of one or more programming channels based on current network conditions. That is, assets may be selected for programming channels in view of current network conditions as opposed to being selected ahead of time based on expected network conditions. Such a process may ensure that high value air time is populated with appropriate assets. For instance, where current network conditions may indicate that an audience is larger than expected for a current programming period, higher value assets may be utilized to populate breaks. Such conditions may exist when, for example, programming with high asset delivery value and a large expected audience extends beyond a predetermined programming period into a subsequent programming period with low asset delivery value (e.g., a sporting event goes into overtime). Previously, assets directed to the subsequent low value programming period might be aired to the larger than expected viewing audience based on their pre-scheduled delivery times resulting in reduced revenue opportunities. The present system allows for dynamic (e.g., just-in-time) asset scheduling or, at least, overriding pre-scheduled delivery based on changing network conditions.

As noted, signals from the individual UEDs may be utilized for targeted asset system purposes. However, it will be appreciated that while it is possible to receive vote signals from each UED in a network, such full network 'polling' may result in large bandwidth requirements. In one alternate implementation, statistical sampling is utilized to reduce the bandwidth requirements between the network and the UEDs. As will be appreciated, sampling of a statistically significant and relevant portion of the UEDs will provide a useful representation of the channels currently being used as well as a useful representation of the most appropriate assets for the users using those channels.

In order to provide statistical sampling for the network, a subset of less than all of the UEDs may provide signals to the network platform. For instance, in a first arrangement, each UED may include a random number generator. Periodically, such a random number generator may generate an output. If this output meets a predetermined criteria (e.g., a number ending with 5), the UED may provide a signal to the network in relation to an option list. Alternatively, the platform may be operative to randomly select a subset of UEDs to receive a request for information. In any case, it is preferable that the subset of UEDs be large enough in comparison to the total number of UEDs to provide a statistically accurate overview of current network conditions. However, where a fully representative sampling is not available, attendant uncertainties can be addressed through business rules, e.g., providing a reduced price or greater dissemination to account for the uncertainty.

As noted, a network operator initially provides an asset option list (e.g., list 1010 of FIG. 10) to at least the UEDs within the network that will vote on assets from the list. Generally, the asset option list includes a list of available assets for one or more upcoming breaks. In this regard, it will be appreciated that a platform within the network may be operative to obtain schedule information for all programming channels that have been identified to be supported by targeted assets. The platform may then use the schedule information to communicate with UEDs over the network interface prior to a break. In particular, the platform may be operative to provide the asset option list to UEDs, for example, periodically.

C. Reporting

It would be possible to implement the targeted asset system of the present invention without receiving reports from UEDs indicating which assets, from among the asset options, were delivered to the user(s). That is, although there would be considerable uncertainty as to what assets were delivered to whom, assets could be priced based on what can be inferred regarding current network conditions due to the voting process. Such pricing may be improved in certain respects in relation to ratings or share-based pricing under the conventional asset delivery paradigm. Alternatively, pricing may be based entirely on demographic rating information such as Nielsen data together with a record of asset insertion to build an estimate of the number of users who received an asset. For example, this may work in connection with programming channels that have good rating information.

However, in connection with the UED selection model, it may be desirable to obtain report information concerning actual delivery of assets. That is, because the asset selection occurs at the UED (in either a forward-and-store or synchronized transmission architecture) improved certainty regarding the size and audience classification values for actual delivery of assets can be enhanced by way of a reporting process. The present invention provides an appropriate reporting process and in this regard provides a mechanism for using such report information to enable billing based on guaranteed delivery and/or a goodness of fit of the actual audience to the target audience. In addition to improving the quality of billing information and information available for analysis of asset effectiveness and return on investment, this reporting information provides for near real time (in some reporting implementations) audience measurement with a high degree of accuracy. In this regard, the reporting may be preferred over voting as a measurement tool because reports provide a positive, after-the-fact indication of actual audience size. Accordingly, such information may allow for improved ratings and share data. For example, such data may be licensed to networks or ratings measurement entities.

FIG. 15 illustrates a reporting system 1500 in accordance with the present invention. The reporting system 1500 is operative to allow at least some users of a participating user group, generally identified by reference numeral 1502, to report actual asset delivery. In the illustrated implementation, such report information is transmitted to a network platform such as a headend 1504. The report information may be further processed by an operations center 1506 and a traffic and billing system 1508.

More specifically, report information is generated by individual UEDs 1513 each of which includes a report processing module 1516, an asset selector module 1518 and a user monitoring module 1520. The user monitoring module 1520 monitors inputs from a current user and analyzes the inputs to determine putative audience classification parameter values for the user. Thus, for example, module 1520 may analyze a click stream from a remote control together with information useful for matching a pattern of that click stream to probable audience classification parameter values.

These classification parameters may then be used by the asset selector module 1518 to select an asset or asset sequence from available asset options. Thus, as described above, multiple asset sequences may be available on the programming channel and separate asset channels. Metadata disseminated with or in advance of these assets may identify a target audience for the assets in terms of audience classification parameter values. Accordingly, the module 1518 can select an asset from the available options for delivery to the user (s) by matching putative audience classification parameter values of the user to target audience classification parameter values of the asset options. Once an appropriate asset option has been identified, delivery is executed by switching to the corresponding asset channel (or remaining on the programming channel) as appropriate.

The report processing module 1516 is operative to report to the headend 1504 information regarding assets actually delivered and in some implementations, certain audience classification parameter values of the user (s) to whom the asset was delivered. Accordingly, in such implementations, the report processing module 1516 receives asset delivery information from module 1518 and putative audience classification parameter information for the user (s) from the user monitoring module 1520. This information is used to populate various fields of a report file 1510. In other implementations, audience classification information is not included in the report 1512. However, it may be presumed that the asset was delivered to a user or users matching the target parameters. Moreover, such a presumption may be supported by a goodness of fit parameter included in the report. Thus, audience classification information may be inferred even where the report is devoid of sensitive information.

The report files pass through the headend 1504 and are processed by an operations center 1506. The operations center 1506 is operative to perform a number of functions including processing report information for submission to billing and diagnostic functions as noted above. The operations center 1506 then forwards the processed report information to the traffic and billing system 1508. The traffic and billing system 1508 uses the processed report information to provide measurement information to asset providers with respect to delivered assets, to assign appropriate billing values for delivered assets, and to estimate the target universe in connection with developing new asset delivery contracts.

In order to reduce the bandwidth requirements associated with reporting, a statistical reporting process may be implemented similar to the statistical voting process described above. In particular, rather than having all UEDs report delivery with respect to all breaks, it may be desirable to obtain reports from a statistical sampling of the audience 1502. For example, the UED of each user may include a random number generator to generate a number in connection with each reporting opportunity. Associated logic may be configured such that the UED will only transmit a report file when certain numbers are generated, e.g., numbers ending with the digit "5". Alternatively, the UED may generate reports only upon interrogation by the headend 1504 or the headend 1504 may be configured to interrogate only a sampling of the audience 1502. Such statistical reporting is graphically depicted in FIG. 15 where users selected to report with respect to a given reporting opportunity are associated with solid line links and deselected users are associated with a broken line links. Moreover, reporting may be batched such that all reports for a time period, e.g., 24 hours or seven days, may be collected in a single report transmission. Such transmissions may be timed, for example, to coincide with low messaging traffic time periods of the network. Also, the reports from different UEDs may be spread over time.

Billing parameters and goodness of fit information may then be determined based on the report information. The billing parameters will generally include information regarding the size of the audience to whom an asset was delivered. The goodness of fit information relates to how well the actual audience matched the target audience of the asset provider. In this regard, a premium may be extracted where the fit is good or a discount or credit may be applied, or over delivery may be provided where the fit was not as good. Based on this information, the T&B system can then generate billing records. It will be appreciated that such billing reflects guaranteed delivery of targeted impressions with compensation for less than optimal delivery.

As noted above, a platform and associated graphical user interface may be provided for receiving asset contract information. As will be described in more detail below, asset providers can use this interface to specify ad campaign information including targeting criteria such as geographic information, demographic information, run-time information, run frequency information, run sequence information and other information that defines asset delivery constraints. Similarly, constraint information may be provided from other sources.

This contract information may also include certain pricing information including pricing parameters related to goodness of fit. Moreover, in accordance with the present invention, report information can be utilized as described above for purposes of traffic and billing. All of this requires a degree of integration between the T&B system, which may be a conventional product developed in the context of the conventional asset delivery paradigm, and the targeted asset delivery system of the present invention, which allows for implementation of a novel asset delivery paradigm.

Among other things, this integration requires appropriate configuration of the T&B system, appropriate configuration of the targeted asset delivery system, and a definition of an appropriate messaging protocol and messaging fields for transfer of information between the T&B system and the targeted asset delivery system. With respect to the T&B system, the system may be configured to recognize new fields of traffic and billing data related to targeted asset delivery. These fields may be associated with: the use of reporting data, as contrasted to ratings or share data, to determine billing values; the use of goodness of fit parameters to determine billing parameters; and the use of report information in estimating the target universe for subsequent broadcasts. Accordingly, the T&B system is configured to recognize a variety of fields in this regard and execute associated logic for calculating billing parameters in accordance with asset delivery contracts.

The targeted asset system receives a variety of asset contract information via a defined graphical user interface. This asset contract information may set various constraints related to the target audience, goodness of fit parameters and the like. In addition, the graphical user interface may be operative to project, in substantially real time, an estimated target universe associated with the defined contract parameters. Consequently, integration of the targeted asset delivery system with the T&B system may involve configuring the targeted asset delivery system such that inputs entered via the graphical user interface are mapped to the appropriate fields recognized by the targeted asset delivery system. In addition, such integration may involve recognizing report information forwarded from the targeted asset delivery system for use in estimating the target universe. Generally, the T & B system is modified to included logic in this regard for using the information from the targeted asset delivery system to project a target universe as a function of various contract information entered by the asset provider via graphical user interface.

IV. EXEMPLARY SYSTEM IMPLEMENTATIONS

Various combinations of the above-described systems and methods may be utilized to provide a content-based targeting system that utilizes textual information associated with programming that is or will be provided on a broadcast network channel to identify assets that may be of interest to an audience of the channel. Such content-based targeting provides the asset provider another tool for describing the desired audience for a targeted advertisement. In application, the asset provider or ad buyer specifies one or more keywords, which may or must appear in the textual information associated with a program. Such textual information or 'fields' include, without limitation, a program's electronic program guide (EPG) entry (e.g. program title, sub-title, and/or episode description) and/or the program's closed captioning. If one or more of the specified keywords appear in a textual field of the current program (e.g., EPG fields and/or closed captioning text) then the asset may be deemed appropriate for a current audience (i.e. deemed suitable for delivery). Otherwise, the asset may be deemed not suitable for delivery.

In the event that two or more assets are deemed suitable for delivery (i.e, based on their keyword targeting constraints), the content-based targeting system may select between and/or rank assets deemed suitable for delivery. For instance the content-based targeting system may favor targeted assets whose keyword-based targeting constraints match more keywords in one or more textual fields over assets whose keyword-based targeting constraints match fewer matching keywords in one or more textual fields. For example, an asset with a keyword-based constraint specifying four keywords which all match would be favored over an asset with a keyword-based constraint specifying three keywords which all match. As will be discussed herein, variations may be implemented for selecting between suitable assets. Further, secondary targeting constraints/criteria may be utilized to select between two or more otherwise suitable assets.

Figure 16:
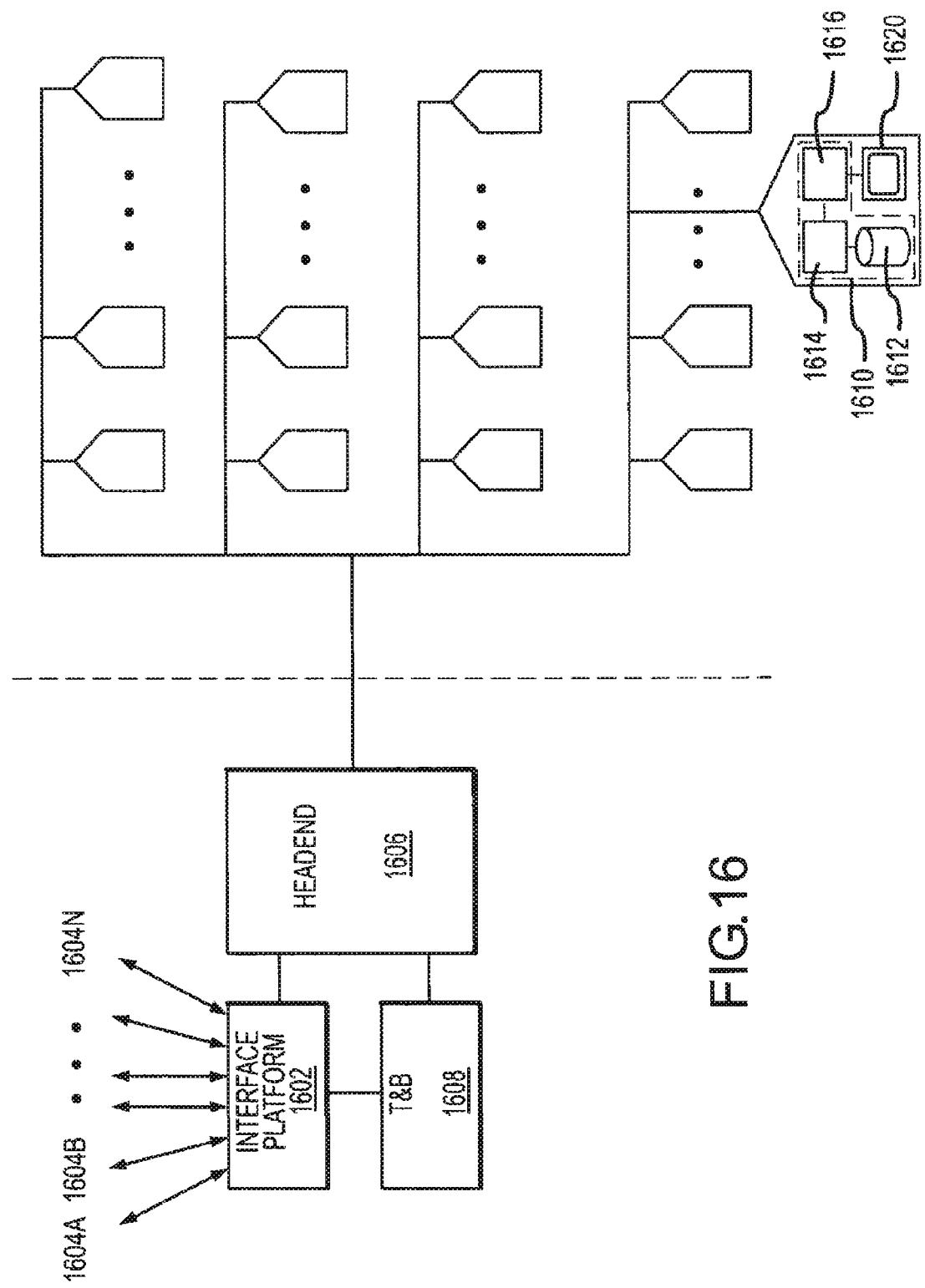
FIG. 16 illustrates a content-based targeting system.

As shown in FIG. 16, the content-based targeting system 1600 includes a platform 1602 for use in receiving textual constraint inputs from asset providers. The platform 1602 is accessible by a plurality of asset providers 1604A-N. Such access may be provided using, for example, a graphical user interface, web access, etc. The platform 1602 allows asset providers to provide assets to the system as well as provide targeting constraints for those assets. That is, the platform 1602 may allow asset providers to upload content (e.g., assets) to the system such that the content may be inserted into broadcast content based on one or more specified constraints and/or targeting criteria. In any case, the platform 1602 is in communication with a headend 1606 that is operative to implement part or all of the asset targeting systems and methods described above. Further, the platform is in communication with a traffic and billing system (T & B System) 1608.

Figure 17:
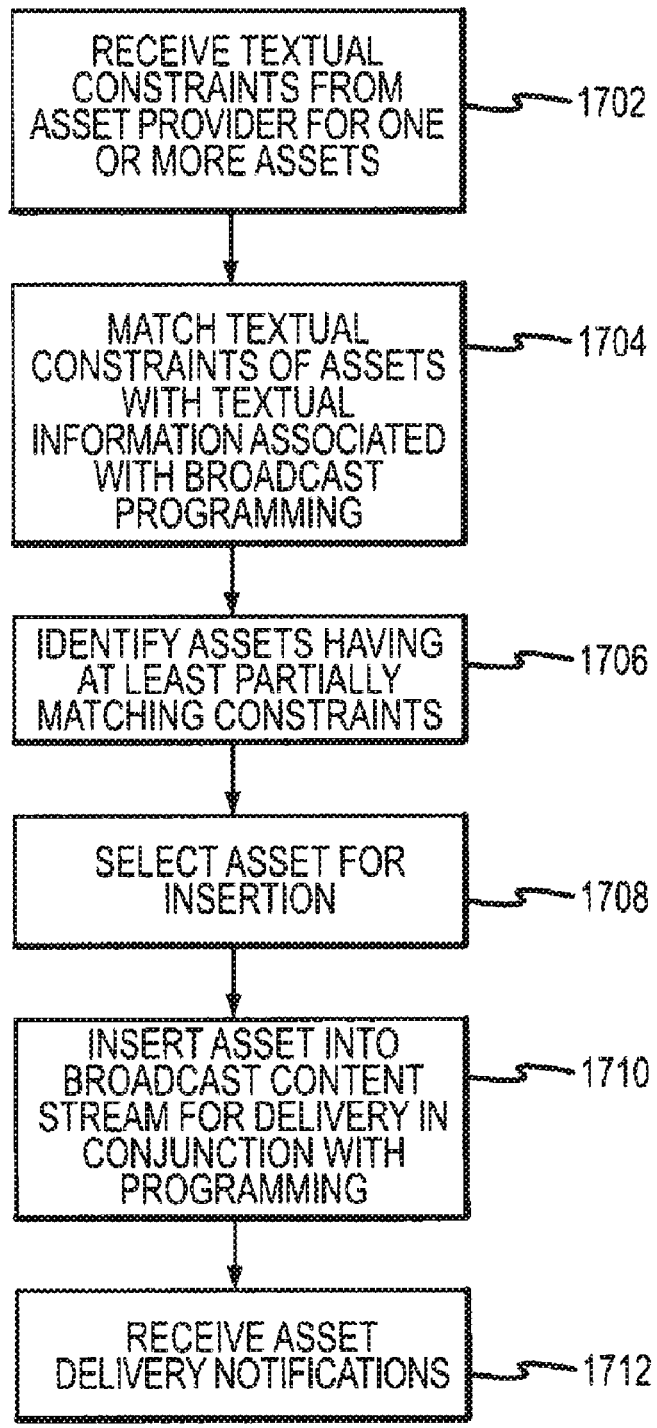
FIG. 17 illustrates a process for implementing a content-based targeting system.

As illustrated in FIG. 17, an asset provider begins the process 1700 of content-based targeting by using a GUI (or other system-to-system interface) to specify textual constraints 1702 to be utilized with their asset(s). Once textual constraints for various different assets (e.g., of different asset providers) are received, the content-based targeting system may compare or match 1704 the textual constraints of the assets with textual information associated with broadcast programming. That is, the content-based targeting system may monitor textual fields of programming being delivered or that will be delivered via the broadcast network. That is, such monitoring and associated matching may be performed on-the-fly while the program is being broadcast or prior to broadcast of the programming. In either case, the content-based targeting system may identify 1706 assets that have at least partially matching textual constraints. That is, the content-based targeting system may identify assets that are deemed suitable for delivery. One of the assets deemed suitable for delivery may be selected 1708 for insertion 1710 into a broadcast stream such that the asset may be broadcast in conjunction with, for example, an asset delivery spot in the programming. Further, a portion or all of the UEDs within the broadcast network that provide the selected asset to a network user may provide 1712 an asset delivery notification to the headend. These notifications may be utilized for billing purposes and/or for the generation of historical databases. As will be discussed herein, each of the steps of the process 1700 of FIG. 17 may include various alterations and/or sub-steps.

FIG. 18 illustrates one exemplary graphical user interface 1800 that may be utilized to enter textual constraints for a particular asset. As shown, the asset provider provides an asset identifier 1802 for their asset. The asset provider also typically specifies one or more mandatory keywords 1804 that must appear in the textual fields of the programming for the identified asset to be deemed suitable for delivery. Further, if a plurality of keywords are specified, the asset provider may specify the minimum number of those keywords that must match text in the textual fields of the programming in order for the asset to be deemed suitable for delivery. The asset provider may also specify mandatory keywords that must appear and optional keywords 1806 that may but are not required to appear. The presence of optional keywords that match may increase how favorably the asset is considered (e.g., a goodness of fit value) when selecting between and/or ranking multiple assets with keyword-based targeting constraints.

Further, the asset provider may establish matching criteria and/or combine one or more of the above-noted mechanisms. For example, the asset provider may define textual constraints for an asset such that the asset includes 3 mandatory keywords and 3 optional keywords 1808. The asset provider may then specify that at least 4 keywords must match in order for the asset to be deemed suitable for delivery.

The asset provider may also associate a positive weighting factor 1810 with each keyword. When selecting and/or ranking multiple targeted assets with keyword-based targeting constraints, the content-based targeting system may sum the weighting factors of the keywords that matched. The content-based targeting system may then view more favorably those targeted assets whose weighting factors for matched keywords summed to the highest values. In this regard, different textual constraints or keywords may have different values. Keywords that are more indicative of a desired audience may be more heavily weighted whereas keywords that are relevant but less indicative of a desired audience may be given a lower weight.

The asset provider may also assign negative weighting factors to textual constraints. In such an arrangement, textual constraints that match textual information but which have negative weighting factors reduce how favorably the targeted asset is viewed. In a further alternative arrangement, the asset provider may specify negative limitations. In this regard, the asset provider may specify one or more keywords that may not appear in any of the textual information of the programming. When receiving textual constraints from an asset provider, the asset provider may use any word or any sequence of letters, digits and/or other characters as a textual constraint (e.g., keyword). Alternatively, the asset provider may be required or enabled to select keywords from a pre-defined list 1814 of textual constraints and/or other sequences of letters, digits and other characters. The asset provider may also select a thesaurus function (e.g., synonyms) that allows similar terms 1816 to satisfy textual constraints instead of requiring an exact match 1818. For example if the keyword "computer" is specified then system might suggest alternatives such as "CPU" or "processor" and allow the user to select or allow such alternatives. As a further alternative, predefined collections of keywords may be available for selection. For example, a Sports Equipment bundle may include golf club, tennis racquet, hockey stick, etc. In this manner, common collections of terms of interest to asset providers can be conveniently available. These collections may be developed in advance and/or based on experience as asset providers use the system.

An asset provider may also select various alternate searching constraints in conjunction with specifying textual constraints for their asset(s). For instance, an asset provider may specify that comparison of the textual constraints with textual information of the programming be performed with regard to a specific textual field 1820 such as an electronic program guide (EPG) search or a closed caption search. For instance, if the asset provider limited comparison to a title field of a program, the closed captioning data stream would be ignored when searching for textual matches. Alternatively, the asset provider may request searches of both the EPG (or a subset of the EPG) and the closed captioning. As noted above, different types of closed captioning exist, and all types, or specified types, can be searched. In order to reduce the likelihood of false hits, an alternative implementation allows the specification of keywords to be contextual. For example, when the asset provider specifies that multiple keywords be matched, the asset provider may specify how closely together or how far apart (i.e., proximity 1824) specified pairs of keywords must be. In the case of closed captioning, this proximity relationship could be temporal, e.g., within 60 seconds of one another.

Additional textual information sources (e.g., programming reviews, etc) may also be accessed to provide additional sources of textual information regarding the content of particular programming. If such additional sources are available, the asset provider may likewise specify whether such additional sources should be searched to match textual constrains of the assets.

The step of matching textual constraints with textual information may be implemented by identifying the presence or absence of a specified constraint within one or more textual fields associated with a given program. Such matching may be performed in a binary manner wherein the textual constraints are satisfied or not satisfied. If the textual constraints are satisfied, the asset may be deemed suitable for delivery with the program One of the assets deemed suitable for delivery (e.g., a matching asset) may then be selected for insertion. For instance, content-based targeting system may randomly choose among the matching assets. The 'fit' of the textual constraints of different assets with the textual information/fields of the program may be rated. In this regard, a goodness of fit score may be generated for each asset. In such an arrangement, all targeted assets could be ranked and those assets deemed most suitable (e.g., having the highest fit value) may be inserted into the programming. Further, secondary considerations/targeting criteria 1822 may be utilized to determine which of multiple matching assets will be delivered in conjunction with the program.

Figure 19:
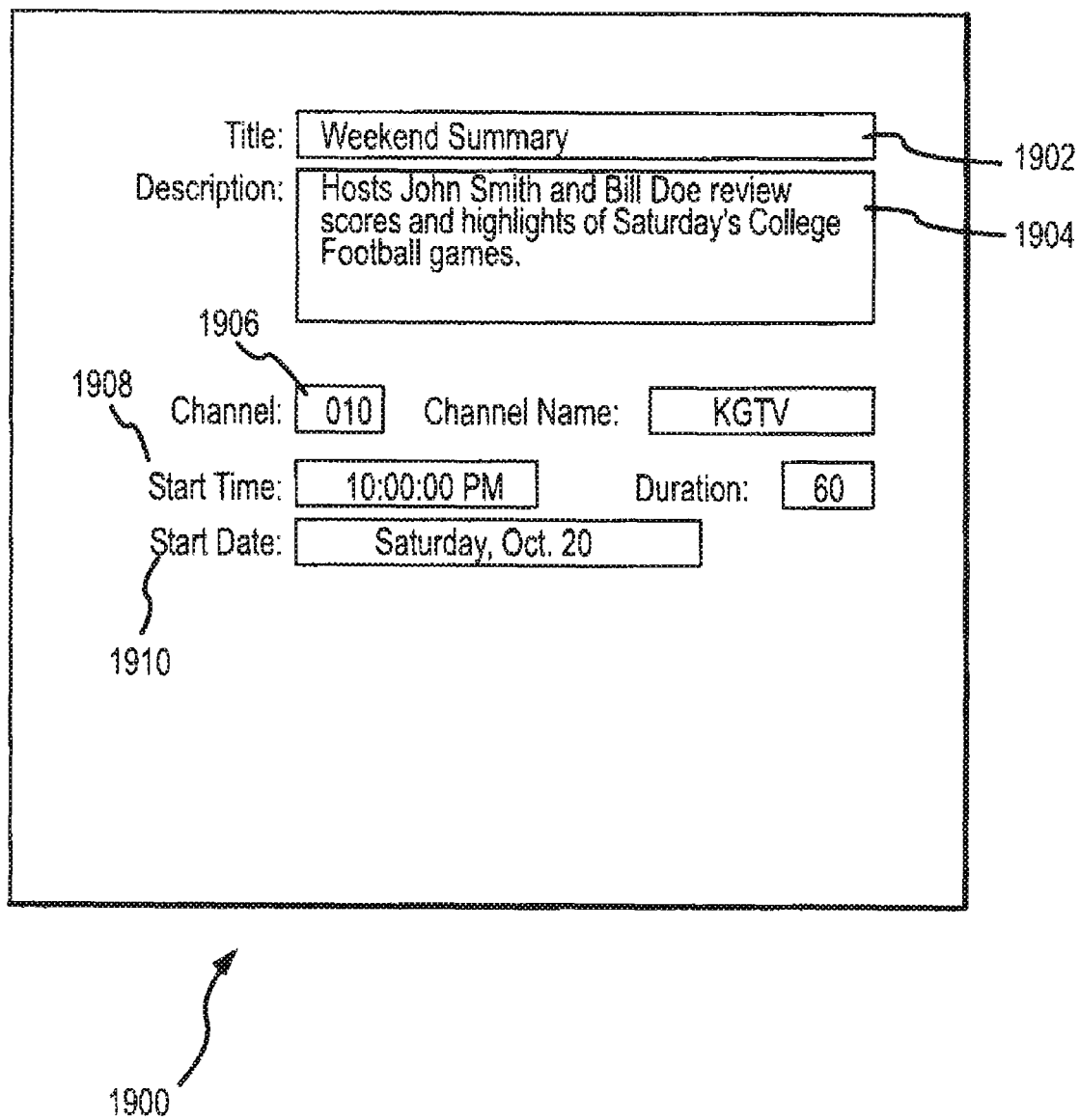
FIG. 19 illustrates an exemplary EPG entry.

FIG. 19 illustrates an exemplary EPG entry for a television program. As shown, the EPG entry 1900 includes a title section 1902 and a textual description 1904 associated with the program. The EPG 1900 also includes channel information 1906, as well as a start time 1908 and start date 1910. As shown, textual fields of the EPG may be searched to identify matching keywords associated with textual constraints of one or more assets. For instance, in the case of the textual constraints of the asset identified in FIG. 18, one of the mandatory keywords (e.g., football) and one of the optional keywords (i.e., highlights) may be matched to the description field 1904 of the EPG entry 1900. Accordingly, the asset identified in FIG. 18 may be considered a match for the program associated with the EPG of FIG. 19.

In most instances, two or more assets will be deemed suitable for delivery. Accordingly, secondary constraints or targeting criteria 1822 may be utilized to select between suitable assets. In this regard, the keyword-based targeting system may also be implemented in conjunction with any combination of other targeting mechanisms. For example, when an asset is initially deemed suitable for delivery based on keyword targeting, secondary targeting criteria may be used to determine whether or not the targeted asset is the best asset available for dissemination/delivery. Alternatively, how favorably a targeted advertisement is viewed based on its keyword targeting constraints could be combined with other targeting mechanisms to yield an overall goodness of fit value for delivery. The asset with the best fit value may then be selected. Such additional targeting criteria may include, without limitation, any or all of the following:

- Demographic classifications
- Price asset provider is willing to pay for ad insertion
- Time of day limitations
- Day of week limitations
- Geographic restrictions
- Household tags (e.g. determined using UED identifier lists from the headend that direct a UED to select an asset or type of asset)
- Network inclusions and exclusions
- Program rating inclusions and exclusions
- Program title word inclusions and exclusions
- Commodity codes
- Minimum separation between presentations of the asset Any combination of these targeting criteria may be utilized to select between suitable assets.

The selected asset may be inserted into a broadcast content stream in various different arrangements. In a first arrangement, the selected asset may be inserted directly into the broadcast stream containing the program. In this regard, the selected asset may replace an asset in the programming. In an alternate arrangement, the selected asset may be inserted into a parallel content stream that is broadcast in synchrony with the programming. In such an arrangement, a portion or all the UEDs of network users may be instructed to switch to or otherwise select the parallel content stream containing the selected asset during, for example, an asset delivery spot within the program. The preceding discussion assumes only one parallel distribution alternative. However, a plurality of parallel distribution alternatives may exist. That is, a multi-channel flotilla may be available for providing multiple different assets during a common asset delivery spot. Accordingly, a separate asset may be selected for each channel of the flotilla based at least in part on textual constraints. However, an asset provider may also specify that no alternative assets be available. Accordingly, the asset provider may pay an additional surcharge for such exclusivity.

When an asset provider is contemplating purchasing targeted advertising opportunities from a network provider, the network provider is generally expected to provide the asset provider with an estimate of the number of network users who will receive the targeted asset. Generally, a keyword-based targeting constraint is analogous to any other constraint which targets on the basis of which program is currently being viewed. Consequently, any audience size prediction algorithm which is useful when estimating the audience size for an asset targeted at least in part by program-based targeting may also be useful when estimate the audience size for an asset targeted using content-based targeting.

However, content-based targeting may introduce an issue which is not found with various other targeting constraints. The issue is that as a keyword-based targeting constraint could match words that appear in a description of a program or the closed captioning data stream of a program, it may not in some instances be possible to determine whether or not a particular content-based textual constraint matches a given program until shortly before the program is broadcast or until the program broadcast begins. Accordingly, if audience estimates are utilized by asset providers to select potential programs for content-based targeting and pricing is based on those estimates, it may be beneficial to receive actual reports of delivered assets (e.g., ADRs) to determine to if the audience estimates are accurate and/or if adjustment should be made to the pricing for a given asset delivery spot that is filled by a content-based targeted asset.

When asset providers select keywords from a pre-defined list, those predefined keywords may be utilized, over time, to generate a historical database of the impact of various keyword and targeting constraints on audience size. As will be appreciated, even a modest sized list of pre-defined keywords may result in a vast number of different combinations of keywords. However, the number of combinations that are actually used is typically a small fraction of the possible combinations as the vast majority of combinations are unlikely to be attractive to the typical asset provider. Further, the number of different keywords combinations that are utilized are likely to have a reasonably predictable impact on audience size as each keyword typically eliminates a substantial number of programs. Accordingly, over time it is possible to build up a historical database of the impact on audience size of various combinations of keywords and options and to use this database to estimate the impact of adding one more constraint and/or one more option to a keyword-based constraint. In this regard, the interface 1800 may provide pre-defined word lists 1814 that "highlight" which keywords and/or combinations of keyword have the largest impact on the audience targeting.

In a further arrangement, the selected assets may be inserted by a UED. As will be appreciated, many UEDs have storage media (e.g., computer hard drives) which are used to store recorded programs and the like. Such UEDs may be utilized to cache targeted assets on the hard drive. This local cache of assets may then become either the only source or an alternative source of content-based targeted assets that may be delivered during an asset delivery spot. As may be appreciated, this allows for individualized insertion of assets for individual network users. Furthermore, as the programming being consumed by the network user is putatively of interest to the network user, matching assets based on the content of the programming, with or without additional UED based targeting constraints, increase the likelihood of providing assets that are of interest to the network user.

Figure 20:
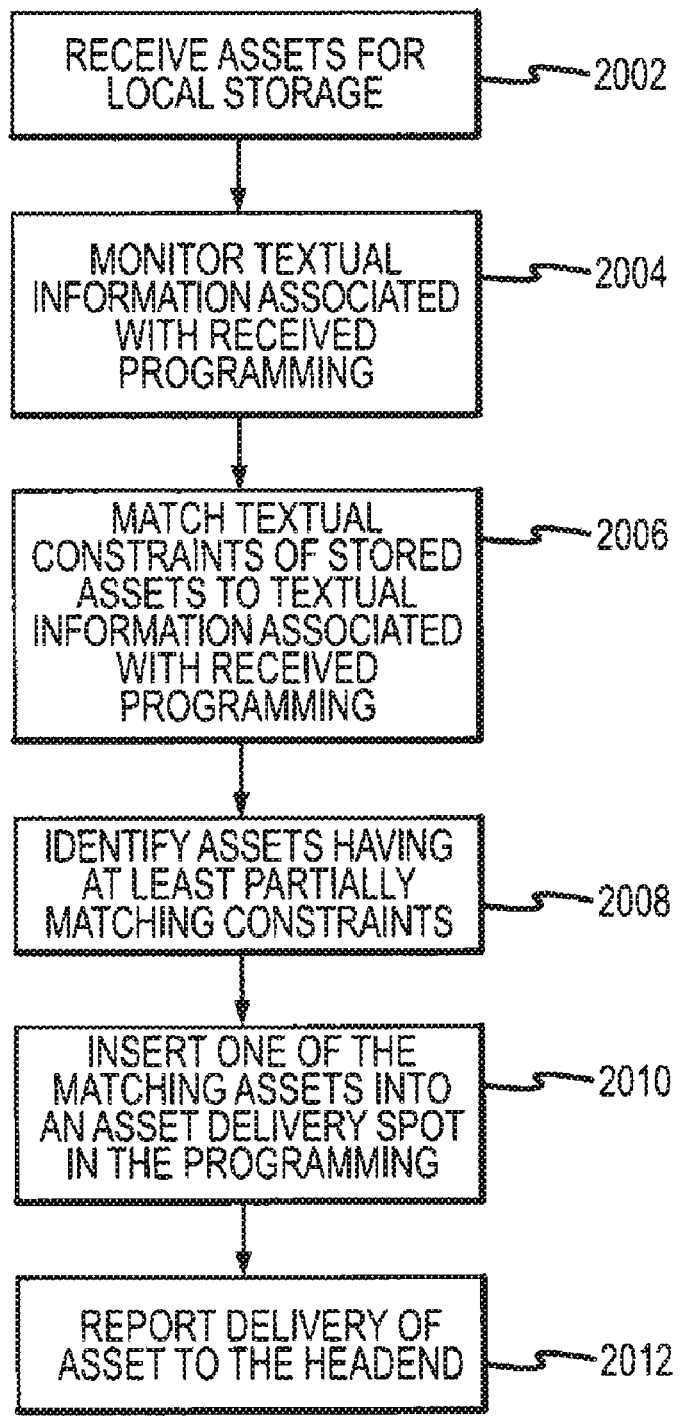
FIG. 20 illustrates a process for implementing content-based targeting at a UED.

In such an arrangement, the UED performs keyword matching as illustrated in the process 2000 of FIG. 20 and the system of FIG. 16. In this regard, a UED 1610 may receive assets (2002) from the headend 1606 via a network interface 1614 for storage in a storage device 1612. Such assets may specify various textual constraints as discussed above. Accordingly, a processor 1616 of the UED may utilize the textual constraints of the stored assets to select one of those assets for insertion during an asset delivery spot of a program. More specifically, the UED 1610 monitors (2004) textual information of a program that is being output 1620 to a current network user. Such monitoring may include monitoring of the EPG and/or monitoring closed captioning of the program. The UED 1610 matches (2006) textual constraints of the stored assets with the textual information. In instances where the closed captioning is being monitored, it will be appreciated that the textual information may change over time. Accordingly, the UED 1610 may be operative to periodically update textual constraint matches or utilized a fixed period of closed captioning (e.g., the first five minutes of a program) for textual constraint matching purposes. In any case, the UED identifies (2008) assets that are suitable for insertion in one or more upcoming asset delivery spots in the program. Accordingly, the UED inserts (2010) one of the suitable assets into the asset delivery spot. As outlined above, selection between suitable assets may include use of secondary targeting criteria associated with the assets and/or preference information associated with the UED. The UED may also provide (2012) an asset delivery notification to the head end and/or a T&B platform. Such notification may be utilized to determine, inter alia, the number of network users who received a particular asset as well as for determining billing information for asset providers.

An asset provider can also buy a spot based on one or more keywords, e.g., that appear in the title or other text associated with the programming. When this occurs, it can be utilized in targeting. Specifically, a headend module may be provided that monitors program descriptions, titles or other text associated with all programming played in the system. When an advertiser buys an ad by keyword, a data structure is created that includes the keyword string. The data structure (such as an ADR) may also include other targeting criteria (such as demographic classifications). The headend module can then search for programming having text that includes the keyword and that otherwise adequately matches the targeting constraints. The asset can then be inserted into that programming. Alternatively, the asset can be included in an asset list that the UEDs use in voting.

The keyword search may also make use of historical viewing habits, e.g., monitored at the UEDs. Specifically, a headend module may send program titles, descriptions or other text to the UED. This information may be filtered to exclude terms not likely to contribute to keyword search efficiency. A popular keyword list may also be sent to the UED. This list may be used by a processor at the UED to store the text only if it includes keywords from the popular keyword search. A similar list may be developed at the UED based on historical viewing habits of one or more users.

When the user enters an input, such as a channel change, the processor can look up text for the selected programming. If that program is viewed for a sufficient time, the text may be stored in a historical viewing habits file. When an asset (or asset list identifier) associated with a keyword is sent to the UED, the historical viewing habits file may be searched to determine how many time the keyword appears. The result may be used, e.g., compared to a threshold, to make voting or delivery decisions. This may be done on a viewer-by-viewer basis. The information in the file may be time-stamped and can be discarded after it reaches a defined age.

While various embodiments of the present invention have been described in detail, further modifications and adaptations of the invention may occur to those skilled in the art. However, it is to be expressly understood that such modifications and adaptations are within the spirit and scope of the present invention.

The invention claimed is:

1. A method for use in connection with delivering assets to users of a broadcast network, the broadcast network primarily involving synchronized distribution of broadcast content to multiple users, the method comprising:
   receiving a broadcast content stream at a UED of a network user;
   receiving a subset of assets at the UED in conjunction with the broadcast content stream, the subset of assets identified by a network interface upstream in the broadcast network with respect to the UED by:
      monitoring textual information associated with said broadcast content stream;
      calculating a goodness of fit value for each of the assets according to a matching between the textual information and textual constraints associated with the assets; and
      identifying the subset of assets as having the highest respective goodness of fit values;
   determining targeting criteria corresponding to each of the subset of assets;
   selecting, at the UED, one of the subset of assets for an asset delivery spot as a function of the targeting criteria; and
   delivering the selected one of the subset of assets via the UED during the asset delivery spot.

2. The method of claim 1, wherein monitoring is performed while said programming is broadcast via the broadcast network.

3. The method of claim 1, wherein monitoring is performed prior to said programming being broadcast via the broadcast network.

4. The method of claim 1, wherein determining said goodness of fit value comprises:
   matching text from a predetermined textual field of the programming with the textual constraints of each asset, wherein said predetermined textual fields are selected by an asset provider.

5. The method of claim 1, wherein said textual constraints comprise at least one of:
   the presence of at least one specified keyword;
   the presence of a predetermined minimum number of specified keywords;
   presence of at least one mandatory keyword and at least one optional keyword;
   the absence of at least one keyword in said textual field; and
   the presence of at least first and second specified keywords in said textual field, wherein said first and second keywords are within a predetermined proximity.

6. The method of claim 1, wherein selecting one of the subset of the identified assets for a predetermined asset delivery spot further comprises:
   selecting an asset having a higher goodness of fit value.

7. The method of claim 1, wherein selecting one of the subset of the identified assets for a predetermined asset delivery spot further comprises:
   utilizing information associated with said programming to select between said plurality of assets having matching textual constraints.

8. The method of claim 1, wherein utilizing said information comprises:
   comparing at least a first of the non-textual targeting criteria of each of the subset of the identified assets with audience classification information for said programming.

9. The method of claim 1, wherein said non-textual targeting criteria relates to at least one of age, gender, income, geographic locale, personal interest, temporal criteria, or network criteria.

10. The method of claim 1, wherein the selected one of the subset of assets has previously been stored in storage associated with said UEDs.

11. The method of claim 1, wherein delivering comprises:
   delivering the selected one of the subset of assets via the UED during the asset delivery spot from a content stream including the programming.

12. The method of claim 11, further comprising:
   providing information to the regarding the availability of said selected asset on said parallel content stream.

13. The method of claim 1, wherein selecting comprises selecting between at least first and second content streams having first and second assets, wherein said first and second assets are different.

14. The method of claim 1, further comprising:
   classifying a current user of the UED as a function of inputs received at the UED over time, wherein selecting the one of the subset of assets for an asset delivery spot as a function of the targeting criteria comprises comparing at least a first of the targeting with the classification of the current user of said UED.

15. The method of claim 14, wherein said targeting criteria relates to at least one of age, gender, income, geographic locale, and personal interest.

16. The method of claim 14, wherein said targeting criteria relates to at least one of an asset account value per user, an asset billing value, or an asset audience size.

17. The method of claim 14, wherein said targeting criteria relates to at least one of a target number of asset impressions or a target frequency for asset delivery.

18. The method of claim 1, wherein selecting an asset comprises:
selecting an asset from a plurality of stored assets, wherein said stored assets are accessible by said UED.

19. The method of claim 1, wherein monitoring comprises monitoring the electronic program guide entry for programming associated with said broadcast content stream.

20. The method of claim 1, wherein monitoring comprises monitoring closed captioning of the broadcast content stream.

21. The method of claim 1, further comprising:
transmitting a delivery notification from said UED to a platform in the broadcast network, wherein said delivery notification identifies the asset delivered during the asset delivery spot.

22. The method of claim 21, wherein said delivery notification further identifies classification information for said UED.

23. The method of claim 21, wherein said delivery notification further identifies classification information for said network user associated with said UED.

24. The method of claim 1, further comprising:
reporting from the UED to a broadcast provider from which the broadcast content stream was received that the selected asset is delivered in conjunction with the programming subsequent to delivering the selected one of the subset of assets via the UED during the asset delivery spot.

25. The method of claim 24, further comprising:
reporting from the UED to the broadcast provider characteristics of the users of the broadcast network to whom the selected asset is delivered in conjunction with the programming subsequent to delivering the selected one of the subset of assets via the UED during the asset delivery spot.

26. The method of claim 1, further comprising:
determining, for the asset delivery spot, whether to replace a default asset corresponding to the predetermined asset delivery spot with the selected one of the subset of assets for the UED as a function of characteristics of at least one user associated with the UED,
wherein the selected one of the subset of assets is delivered via the UED only when it is determined to replace the default asset with the selected one of the subset of assets for that UED as a function of the characteristics of the at least one user and the goodness of fit value of the selected one of the subset of assets.

27. The method of claim 1, further comprising:
identifying a default asset associated with the with the asset delivery spot; and
determining whether to replace the default asset with the selected one of the subset of assets,
wherein the delivering step is performed only when it is determined to replace the default asset with the selected one of the subset of assets.

28. The method of claim 1, further comprising:
determining a current channel being watched via the UED; and
determining at least one of said non-textual targeting criteria according to the determined current channel.

29. The method of claim 1, further comprising:
classifying a current user of the UED as a function of inputs received at the UED over time; and
determining at least one of the non-textual targeting criteria according to the current user.

30. A system that delivers content to users of a broadcast network, said broadcast network primarily involving synchronized distribution of content to multiple users, said system comprising:
a first platform for providing an interface for receiving textual constraints from asset providers, such that each asset is associated with at least one textual constraint received via the interface and is further associated with at least one targeting constraint selected from the group consisting of temporal constraints, demographic constraints, or network constraints; and
a processor operative to:
compare said textual constraints of said assets with textual information associated with the programming to determine a goodness of fit value for each of the subset of assets; and
identify a subset of the assets for presentation in conjunction with the programming according to the respective goodness of fit values; and
deliver said subset of assets along with their respective textual constraints to a downstream second platform in association with an asset delivery spot in such a way that one of the subset of assets is selected by the second platform according to the respective textual constraints for presentation to at least one user of the broadcast network during the asset delivery spot.

31. The system of claim 30, wherein said first or said second platform is further operative for receiving additional targeting constraints related to disseminating said assets.

32. The system of claim 30, wherein said interface is a graphical user interface.

33. The system of claim 30, wherein said interface is a system-to-system interface.

34. The system of claim 30, further comprising:
an asset database, wherein said asset database includes a plurality of assets of a plurality of asset providers.

35. The system of claim 30, further comprising:
a storage medium for storing historical textual information, wherein said historical textual information includes information associated with the inclusion of specified keyword with programming.

36. The system of claim 30, further comprising said second platform.

37. The system of claim 30, wherein said second platform is a head-end or a UED of the broadcast network.

38. A system that delivers content to users of a broadcast network, said broadcast network primarily involving synchronized distribution of content to multiple users, said system comprising:
a first network interface for receiving a content stream and assets from a broadcast network, each of the assets having associated targeting criteria, the first network interface having a processor for:

monitoring textual information associated with programming received via the network interface;

determining a subset of the assets by comparing said textual information with textual constraints associated with the assets to determine a goodness of fit value for each of the assets, such that the subset of assets has the highest respective goodness of fit values; and a second network interface disposed downstream in the broadcast network from the first network interface and configured for:

receiving the subset of assets for presentation in conjunction with said programming from said first network interface;

selecting one of the subset of assets for a predetermined asset delivery spot as a function of its respective targeting criteria; and inserting the selected one of the identified assets into the content stream of the broadcast network for distribution to a user of the broadcast network.

39. The system of claim 38, further comprising:
a storage medium for storing said assets and said textual constraints associated with the assets, wherein said assets are received via the first network interface.

40. The system of claim 38, wherein the processor further comprises:
a storage medium for storing logic instructions for use in comparing said textual information with said textual constraints.

41. The system of claim 38, further comprising:
a report generator for generating a report indicative of assets delivered to a network user, wherein said report is provided to a network platform via the first or the second network interface.

42. The system of claim 41, wherein:
the content stream of the broadcast network is communicated to at least one UED of the broadcast network; and
the report generator generates the report according to reporting information received from the at least one UED indicating that the selected asset is delivered in conjunction with the programming subsequent to inserting the selected one of the identified assets into the content stream of the broadcast network.

43. The system of claim 38, wherein said second network interface is further configured for:
classifying at least one UED downstream of the second network interface in the broadcast system,
wherein selecting the one of the subset of assets for a predetermined asset delivery spot as a function of its respective targeting criteria comprises comparing the targeting criteria of each of the subset of assets to results of the classifying step.

* * * * *

UNITED STATES PATENT AND TRADEMARK OFFICE
CERTIFICATE OF CORRECTION

PATENT NO. : 8,272,009 B2  Page 1 of 1
APPLICATION NO. : 11/761976
DATED : September 18, 2012
INVENTOR(S) : Downey et al.

It is certified that error appears in the above-identified patent and that said Letters Patent is hereby corrected as shown below:

Column 40, line 59, after "information to the", insert --UED--.
Column 41, line 64, delete "with the".

Signed and Sealed this
Twenty-seventh Day of November, 2012

David J. Kappos
*Director of the United States Patent and Trademark Office*